US012533532B2

(12) United States Patent
Burdette

(10) Patent No.: US 12,533,532 B2
(45) Date of Patent: Jan. 27, 2026

(54) IMAGE-GUIDED PULSED VOLUME FOCUSED ULTRASOUND

(71) Applicants: Everette C. Burdette, Champaign, IL (US); ACOUSTIC MEDSYSTEMS, INC., Savoy, IL (US)

(72) Inventor: Everette C. Burdette, Champaign, IL (US)

(73) Assignee: ACOUSTIC MEDSYSTEMS, INC., Savoy, IL (US)

(*) Notice: Subject to any disclaimer, the term of this patent is extended or adjusted under 35 U.S.C. 154(b) by 0 days.

(21) Appl. No.: 17/794,908

(22) PCT Filed: Jan. 25, 2021

(86) PCT No.: PCT/US2021/014943
§ 371 (c)(1),
(2) Date: Jul. 22, 2022

(87) PCT Pub. No.: WO2021/151088
PCT Pub. Date: Jul. 29, 2021

(65) Prior Publication Data
US 2023/0095465 A1    Mar. 30, 2023

Related U.S. Application Data

(60) Provisional application No. 62/965,109, filed on Jan. 23, 2020.

(51) Int. Cl.
*A61N 7/00*    (2006.01)
*A61B 8/00*    (2006.01)
*A61N 7/02*    (2006.01)

(52) U.S. Cl.
CPC .............. *A61N 7/00* (2013.01); *A61B 8/4444* (2013.01); *A61B 8/4488* (2013.01); *A61B 8/546* (2013.01);
(Continued)

(58) Field of Classification Search
CPC . A61N 7/00; A61N 7/02; A61N 7/022; A61N 2007/0078; A61N 2007/0034;
(Continued)

(56) References Cited

U.S. PATENT DOCUMENTS 4,936,303 A * 6/1990 Detwiler .................. A61N 7/02
601/3
5,590,653 A   1/1997 Aida et al.
(Continued)

OTHER PUBLICATIONS

Baek, et al., "A review of low-intensity focused ultrasound for neuromodulation," Biomedical Engineering Letters 7, pp. 135-142 (2017).
(Continued)

*Primary Examiner* — Sean D Mattson
(74) *Attorney, Agent, or Firm* — Foley & Lardner LLP

(57) ABSTRACT

An apparatus comprises a source of ultrasound energy comprising a plurality of ultrasound transducers. Each of the plurality of ultrasound transducers is configured to direct ultrasound energy to a treatment region located at a depth below a skin surface associated with a patient. The apparatus further comprises a control system for controlling power to the plurality of ultrasound transducers and a water circulation system for controlling a temperature associated with the plurality of ultrasound transducers. The apparatus further comprises an imaging transducer for spatially registering the location of the treatment region.

20 Claims, 22 Drawing Sheets

(52) U.S. Cl.
CPC ........ *A61N 7/02* (2013.01); *A61N 2007/0034* (2013.01); *A61N 2007/0078* (2013.01)

(58) Field of Classification Search
CPC .... A61N 2007/0065; A61N 2007/0073; A61N 2007/0095; A61B 8/4444; A61B 8/4488; A61B 8/546; A61B 2090/374; A61B 2090/378
See application file for complete search history.

(56) References Cited

U.S. PATENT DOCUMENTS

| | | | |
|---|---|---|---|
| 5,938,608 A * | 8/1999 | Bieger | A61N 7/02 601/4 |
| 6,685,639 B1 | 2/2004 | Wang et al. | |
| 7,662,099 B2 | 2/2010 | Podany et al. | |
| 7,719,170 B1 * | 5/2010 | Kim | H10N 30/06 310/335 |
| 10,183,183 B2 | 1/2019 | Burdette | |
| 2001/0031922 A1 | 10/2001 | Weng et al. | |
| 2004/0267167 A1 | 12/2004 | Podany et al. | |
| 2005/0240126 A1 | 10/2005 | Foley et al. | |
| 2006/0074313 A1 * | 4/2006 | Slayton | A61N 7/00 600/439 |
| 2007/0167803 A1 * | 7/2007 | Kaminski | B06B 1/0677 600/459 |
| 2008/0177180 A1 | 7/2008 | Azhari et al. | |
| 2008/0228075 A1 * | 9/2008 | Fraser | G01S 15/8977 600/443 |
| 2008/0255478 A1 * | 10/2008 | Burdette | A61N 7/02 601/2 |
| 2009/0062697 A1 | 3/2009 | Zhang et al. | |
| 2009/0163807 A1 | 6/2009 | Sliwa | |
| 2009/0240148 A1 * | 9/2009 | Jeong | A61B 8/4483 600/439 |
| 2009/0240149 A1 * | 9/2009 | Peyman | A61K 49/222 606/4 |
| 2009/0299180 A1 * | 12/2009 | Lacoste | A61N 7/02 600/449 |
| 2009/0306502 A1 * | 12/2009 | Lacoste | A61B 8/4236 600/439 |
| 2011/0077555 A1 | 3/2011 | Wing et al. | |
| 2011/0112405 A1 * | 5/2011 | Barthe | A61B 8/0858 600/459 |
| 2012/0197121 A1 | 8/2012 | Slayton et al. | |
| 2012/0209118 A1 | 8/2012 | Warnking | |
| 2012/0215105 A1 | 8/2012 | Slayton et al. | |
| 2014/0316269 A1 | 10/2014 | Zhang et al. | |
| 2015/0045675 A1 | 2/2015 | Chernomorsky | |
| 2015/0297188 A1 * | 10/2015 | Konofagou | A61B 8/08 600/442 |
| 2016/0296769 A1 | 10/2016 | Barthe et al. | |
| 2018/0055478 A1 * | 3/2018 | Choi | A61B 18/04 |
| 2018/0272158 A1 | 9/2018 | Barthe et al. | |
| 2019/0054324 A1 | 2/2019 | Tsutsumi | |
| 2021/0228913 A1 * | 7/2021 | Burdette | A61B 8/085 |
| 2022/0054864 A1 | 2/2022 | Baldoni | |

OTHER PUBLICATIONS

Anderson, et al., "Fluoro-Jade B Stains Quiescent and Reactive Astrocytes in the Rodent Spinal Cord," Journal of Neurotrauma 20(11), pp. 1223-1231 (2003).
Argyriou, et al., "Chemotherapy-induced peripheral neuropathy in adults: a comprehensive update of the literature," Cancer Management and Research 6, pp. 135-147 (2014).
Ayling, et al., "Automated light-based mapping of motor cortex by photoactivation of channelrhodopsin-2 transgenic mice," Nature Methods 6(3), pp. 219-224 (2009).
Bishop, et al., "Ultrasound Evaluation of the Combined Effects of Thoracolumbar Fascia Injury and Movement Restriction in a Porcine Model," PLOS One 11(1), e0147393, 13 pages (2016).

Blumenfeld, et al., "Expert Consensus Recommendations for the Performance of Peripheral Nerve Blocks for Headaches—A Narrative Review," Headache 53(3), pp. 437-446 (2013).
Blumenfeld, et al., "Occipital and Trigeminal Nerve Blocks for Migraine," Headache 55(5), pp. 682-689 (2015).
Brosamle & Schwab, "Cells of origin, course, and termination patterns of the ventral, uncrossed component of the mature rat corticospinal tract," The Journal of Comparative Neurology 386(2), pp. 293-303 (1997).
Bundgaard, et al., "Evaluation of Systemic and Local Inflammatory Parameters and Manifestations of Pain in an Equine Experimental Wound Model," Journal of Equine Veterinary Science 68, pp. 81-87 (2018) (31 page accepted manuscript provided).
Burdette, et al., "The ACUSITT ultrasonic ablator: the first steerable needle with an integrated interventional tool," Proceedings vol. 7629, Medical Imaging 2010: Ultrasonic Imaging, Tomography, and Therapy, 76290V, 10 pages (2010).
Burdette, et al., "Ultrasound therapy applicators for controlled thermal modification of tissue," Proceedings vol. 7901, Energy-based Treatment of Tissue and Assessment Vi, 79010W, 12 pages (2011).
Campbell & Meyer, "Mechanisms of neuropathic pain," Neuron 52(1), pp. 77-92 (2006).
Castel, et al., "Peripheral Neuritis Trauma in Pigs: A Neuropathic Pain Model," The Journal of Pain 17(1), pp. 36-49 (2016).
Chaplan, et al., "Quantitative assessment of tactile allodynia in the rat paw," Journal of Neuroscience Methods 53(1), pp. 55-63 (1994).
Colucci, et al., "Focused Ultrasound Effects on Nerve Action Potential in vitro," Ultrasound in Medicine & Biology 35(10), pp. 1737-1747 (2009).
Daglioglu, et al., "Neuroprotective Effect of Melatonin on Experimental Peripheral Nerve Injury: An Electron Microscopic and Biochemical Study," Central European Neurosurgery 70(3), pp. 109-114 (2009).
Damianou, et al., "Evaluation of accuracy of a theoretical model for predicting the necrosed tissue volume during focused ultrasound surgery," IEEE Transactions on Ultrasonics, Ferroelectrics, and Frequency Control 42(2), pp. 182-187 (1995).
Damjanac, et al., "Fluoro-Jade B staining as useful tool to identify activated microglia and astrocytes in a mouse transgenic model of Alzheimer's disease," Brain Research 1128, pp. 40-49 (2007).
De La Cruz, et al., "Treatment of Allodynia by Occipital Nerve Stimulation in Chronic Migraine Rodent," Neurosurgery 77(3), pp. 479-485 (2015).
Dewey, "Arrhenius relationships from the molecule and cell to the clinic," International Journal of Hyperthermia 25(1), pp. 3-20 (2009).
Di Giminiani, et al., "Characterization of nociceptive behavioural responses in the awake pig following UV-B-induced inflammation," European Journal of Pain 18(1), pp. 20-28 (2014).
Diederich & Burdette, "Transurethral ultrasound array for prostate thermal therapy: initial studies," IEEE Transactions on Ultrasonics, Ferroelectrics, and Frequency Control 43(6), pp. 1011-1022 (1996).
Diederich, "Thermal ablation and high-temperature thermal therapy: Overview of technology and clinical implementation," International Journal of Hyperthermia 21(8), pp. 745-753 (2005).
Diederich, et al., "Combination of transurethral and interstitial ultrasound applicators for high-temperature prostate thermal therapy," International Journal of Hyperthermia 16(5), pp. 385-403 (2009).
Diederich, et al., "Interstitial ultrasound applicators for localized thermal coagulation of tissue," IEEE Ultrasonics Symposium. Proceedings, pp. 1303-1307 (1996).
Diederich, et al., "Ultrasound applicators for interstitial thermal coagulation," IEEE Transactions on Ultrasonics, Ferroelectrics, and Frequency Control 46(5), pp. 1218-1228 (1999).
Edelmayer, et al., "An Experimental Model of Headache-Related Pain," Pain Research: Methods and Protocols, pp. 109-120 (2012).
Foreign Action other than Search Report on PCT PCT/US2021/014943 Dtd Apr. 8, 2021.
Frenandez-De-Las-Penas & Cuadrado, "Therapeutic options for cervicogenic headache," Expert Review of Neurotherapeutics 14(1), pp. 39-49 (2013).

(56) References Cited

OTHER PUBLICATIONS

Gangoliya, et al., "First molecular and serological evidence of Coxiella burnetti infection among sheep and goats of Jammu province of India," Microbial Pathogenesis 130, pp. 100-103 (2019).
Garrett & Geiger, "Anatomy, Bony Pelvis and Lower Limb, Superficial Peroneal (Fibular) Nerve," StatPearls, 30422563, 4 pages (2018).
Gelfand & Goadsby, "A Neurologist's Guide to Acute Migraine Therapy in the Emergency Room," The Neurohospitalist 2(2), pp. 51-59 (2012).
Ghoshal, et al., "Ex-vivo and simulation comparison of multi-angular ablation patterns using catheter-based ultrasound transducers," Proceedings of SPIE 8584, Energy-based Treatment of Tissue and Assessment VII, 85840Y, 11 pages (2013).
Ghoshal, et al., "In situ treatment of liver using catheter based therapeutic ultrasound with combined imaging and GPS tracking," Proceedings of SPIE 8584, Energy-based Treatment of Tissue and Assessment VII, 85840T, 10 pages (2013).
Ghoshal, et al., "Quantitative ultrasound imaging for assessing and monitoring therapy," The Journal of the Acoustical Society of America 132, p. 1982 (2012).
Gregory, et al., "An Overview of Animal Models of Pain: Disease Models and Outcome Measures," The Journal of Pain 14(11), pp. 1255-1269 (2013).
Halim, et al., "Long-Term Pain Relief in Patients with Cervicogenic Headaches after Pulsed Radiofrequency Application into the Lateral Atlantoaxial (C1-2) Joint Using an Anterolateral Approach," Pain Practice 10(4), pp. 267-271 (2010).
Hellman, et al., "Evaluation of Thermal Changes Needed for Focused Ultrasound Modulation of Neuropathic Pain," 2018 American Society for Stereotactic and Functional Neurosurgery Biennial Meeting Abstracts, p. 506 (2018).
Herrera, "Motor and Sensory Nerve Conduction Are Affected Differently by Ice Pack, Ice Massage, and Cold Water Immersion," Physical Therapy 90(4), pp. 581-591 (2010).
Hu, et al., "Burden of Migraine in the United States: Disability and Economic Costs," Archives of Internal Medicine 159(8), pp. 813-818 (1999).
Huisman, et al., "Non-Invasive Targeted Peripheral Nerve Ablation Using 3D MR Neurography and MRI-Guided High-Intensity Focused Ultrasound (MR-HIFU): Pilot Study in a Swine Model," PLOS One 10(12), e0144742, 18 pages (2015).
Inan, et al., "Greater occipital nerve blockade for the treatment of chronic migraine: a randomized, multicenter, double-blind, and placebo-controlled study," Acta Neurologica Scandinavica 132(4), pp. 270-277 (2015).
International Search Report and Written Opinion for PCT PCT/US2021/014943 dated Jun. 4, 2021, 16 pages.
Kakulas, "A Review of the Neuropathology of Human Spinal Cord Injury with Emphasis on Special Features," The Journal of Spinal Cord Medicine 22(2), pp. 119-124 (1999).
Kim, et al., "Sonography-guided recording for superficial peroneal sensory nerve conduction study," Muscle & Nerve 57(4), pp. 628-633 (2018) (20 page accepted manuscript provided).
Korte, et al., "Evaluation of periodic electrodiagnostic measurements to monitor motor recovery after different peripheral nerve lesions in the rat," Muscle & Nerve 44(1), pp. 63-73 (2011).
Lauretti, et al., "Efficacy of the Greater Occipital Nerve Block for Cervicogenic Headache: Comparing Classical and Subcompartmental Techniques," Pain Practice 15(7), pp. 654-661 (2015).
Lee, et al., "High-Intensity Focused Ultrasound Attenuates Neural Responses of Sciatic Nerves Isolated from Normal or Neuropathic Rats," Ultrasound in Medicine & Biology 41(1), pp. 132-142 (2015).
Leonard, et al., "Localization of the corticospinal tract within the porcine spinal cord: Implications for experimental modeling of traumatic spinal cord injury," Neuroscience Letters 648, pp. 1-7 (2017).
Liu, et al., "Touch and tactile neuropathic pain sensitivity are set by corticospinal projections," Nature 561, pp. 547-550 (2018).

Lucado, et al., "Headaches in U.S. Hospitals and Emergency Departments, 2008: Statistical Brief #111," Healthcare Cost and Utilization Project, retrieved from https://europepmc.org/books/NBK56047;jsessionid=AE41445C54C38412E076FD9C7F94F575, 12 pages (2008).
Macfayden, et al., "The commercial pig as a model of spontaneously-occurring osteoarthritis," BMC Musculoskeletal Disorders vol. 20, 70, 12 pages (2019).
Mannion, et al., "Collateral Sprouting of Uninjured Primary Afferent A-Fibers into the Superficial Dorsal Horn of the Adult Rat Spinal Cord after Topical Capsaicin Treatment to the Sciatic Nerve," The Journal of Neuroscience 16(16), pp. 5189-5195 (1996).
Marhofer, et al., "Current concepts and future trends in ultrasound-guided regional anesthesia," Current Opinion in Anesthesiology 23(5), pp. 632-636 (2010).
Mcdannold, et al., "Uterine Leiomyomas: MR Imaging-based Thermometry and Thermal Dosimetry during Focused Ultrasound Thermal Ablation," Radiology 240(1), pp. 263-272 (2006).
Minranpuri, et al., "Comparative Morphometry of the Wisconsin Miniature SwineTM Thoracic Spine for Modeling Human Spine in Translational Spinal Cord Injury Research," Annals of Neurosciences 25(4), pp. 210-218 (2018).
Mitsuzawa, et al., "The Efficacy of a Scaffold-free Bio 3D Conduit Developed from Autologous Dermal Fibroblasts on Peripheral Nerve Regeneration in a Canine Ulnar Nerve Injury Model: A Preclinical Proof-of-Concept Study," Cell Transplantation 28(9-10), pp. 1231-1241 (2019).
Morgalla, et al., "Dorsal Root Ganglion Stimulation (DRGS) for the Treatment of Chronic Neuropathic Pain: A Single-Center Study with Long-Term Prospective Results in 62 Cases," Pain Physician Journal 21(4), pp. E377-E387 (2018).
Murphy, "Occipital neurectomy in the treatment of headache. Results in 30 cases," Maryland State Medical Journal 18(6), pp. 62-66 (1969).
Naja, et al., "Repetitive Occipital Nerve Blockade for Cervicogenic Headache: Expanded Case Report of 47 Adults," Pain Practice 6(4), pp. 278-284 (2006).
Nau, et al., "Evaluation of multielement catheter-cooled interstitial ultrasound applicators for high-temperature thermal therapy," Medical Physics 28(7), pp. 1525-1534 (2001).
Ophir, et al., "Ultrasonic Attenuation Measurements of in Vivo Human Muscle," Ultrasonic Imaging 4(3), pp. 290-295 (1982).
Ostrander, et al., "Demographic history, selection and functional diversity of the canine genome," Nature Reviews Genetics 18, pp. 705-720 (2017).
Pavlakovic & Petzke, "The Role of Quantitative Sensory Testing in the Evaluation of Musculoskeletal Pain Conditions," Current Rheumatology Reports 12, pp. 455-461 (2010).
Pieh, et al., "Gender differences in outcomes of a multimodal pain management program," Pain 153(1), pp. 197-202 (2012).
Pilltsis, et al., "Sensory nerve action potential recordings in low frequency focused ultrasound modulation of common peroneal nerve injury in vivo, " 2019 American Association of Neurological Surgeons Annual Scientific Meeting, p. 403 (2019).
Plesh, et al., "Racial/Ethnic and Gender Prevalences in Reported Common Pains in a National Sample," Journal of Oral & Facial Pain and Headache25(1), pp. 25-31 (2011).
Pope, et al., "A Systematic Review: Current and Future Directions of Dorsal Root Ganglion Therapeutics to Treat Chronic Pain," Pain Medicine 14(10), pp. 1477-1496 (2013).
Prabhala, et al., "External focused ultrasound treatment for neuropathic pain induced by common peroneal nerve injury," Neuroscience Letters 684, pp. 145-151 (2018) (20 page accepted manuscript provided).
Prakash, et al., "Hepatic ablation with multiple interstitial ultrasound applicators: initial ex vivo and computational studies," Proceedings of SPIE 7901, Energy-based Treatment of Tissue and Assessment VI, 79010R, 10 pages (2011).
Rana, "Managing and treating headache of cervicogenic origin," Medical Clinics 97(2), pp. 267-280 (2013).
Rasmussen, et al., "Development and verification of saphenous, tibial and common peroneal nerve block techniques for analgesia

(56) References Cited

OTHER PUBLICATIONS below the thigh in the nonchondrodystrophoid dog," Veterinary Anaesthesia and Analgesia 33(1), pp. 36-48 (2006).
Reddy, et al., "Ovine model of neuropathic pain for assessing mechanisms of spinal cord stimulation therapy via dorsal horn recordings, von Frey filaments, and gait analysis," Journal of Pain Research 11, pp. 1147-1162 (2018).
Rosenzweig, et al., "Extensive spinal decussation and bilateral termination of cervical corticospinal projections in rhesus monkeys," The Journal of Comparative Neurology 513(2), pp. 151-163 (2009).
Sapareto & Dewey, "Thermal dose determination in cancer therapy," International Journal of Radiation Oncology 10(6), pp. 787-800 (1984).
Schmued, et al., "Fluoro-Jade: a novel fluorochrome for the sensitive and reliable histochemical localization of neuronal degeneration," Brain Research 751(1), pp. 37-46 (1997).
Schomberg, et al., "Miniature Swine for Preclinical Modeling of Complexities of Human Disease for Translational Scientific Discovery and Accelerated Development of Therapies and Medical Devices," Toxic Pathology 44(3), pp. 299-314 (2016).
Seip & Ebbini, "Noninvasive estimation of tissue temperature response to heating fields using diagnostic ultrasound," IEEE Transactions on Biomedical Engineering 42(8), pp. 828-839 (1995).
Seltzer, et al., "A novel behavioral model of neuropathic pain disorders produced in rats by partial sciatic nerve injury," Pain 43(2), pp. 205-218 (1990).
Silberstein, et al., "Safety and efficacy of peripheral nerve stimulation of the occipital nerves for the management of chronic migraine: Results from a randomized, multicenter, double-blinded, controlled study," Cephalalgia 32(16), pp. 1165-1179 (2012).
Swindle, et al., "Swine as Models in Biomedical Research and Toxicology Testing," Veterinary Pathology 49(2), pp. 344-356 (2012).
Tufail, et al., "Transcranial Pulsed Ultrasound Stimulates Intact Brain Circuits," Neuron 66(5), pp. 681-694 (2010).
Tufail, et al., "Ultrasonic neuromodulation by brain stimulation with transcranial ultrasound," Nature Protocols 6, pp. 1453-1470 (2011).
Vadakkan, et al., "A behavioral model of neuropathic pain induced by ligation of the common peroneal nerve in mice," The Journal of Pain 6(11), pp. 747-756 (2005).
Verrills, et al., "A review of spinal cord stimulation systems for chronic pain," Journal of Pain Research 9, pp. 481-492 (2016).
Walling, et al., "Pulse Modulation of the Occipital Nerve Using Focused High-Intensity Ultrasound Improves Mechanical Thresholds in a Chronic Migraine Rat Model," Neurosurgery 63(Supp), pp. 150-151 (2016).
Walling, et al., "Pulse Modulation of the Occipital Nerve Using Focused High-Intensity Ultrasound Improves Mechanical Thresholds in a Chronic Migraine Rat Model," Neurosurgery 63, pp. 150-151 (2016).
Walling, et al., "The use of focused ultrasound for the treatment of cutaneous allodynia associated with chronic migraine," Brain Research 1699, pp. 135-141 (2018) (26 page accepted manuscript provided).
Wang, et al., "The Local and Systemic Actions of Duloxetine in Allodynia and Hyperalgesia Using a Rat Skin Incision Pain Model," Anesthesia & Analgesia 121(2), pp. 532-544 (2015).
Youn, et al., "High-Intensity Ultrasound Treatment for Vincristine-Induced Neuropathic Pain," Neurosurgery 83(5), pp. 1068-1075 (2018).
Partial Supplementary European Search Report on EPO App. No. 21743882.9 dated May 3, 2024, 12 pages.

\* cited by examiner

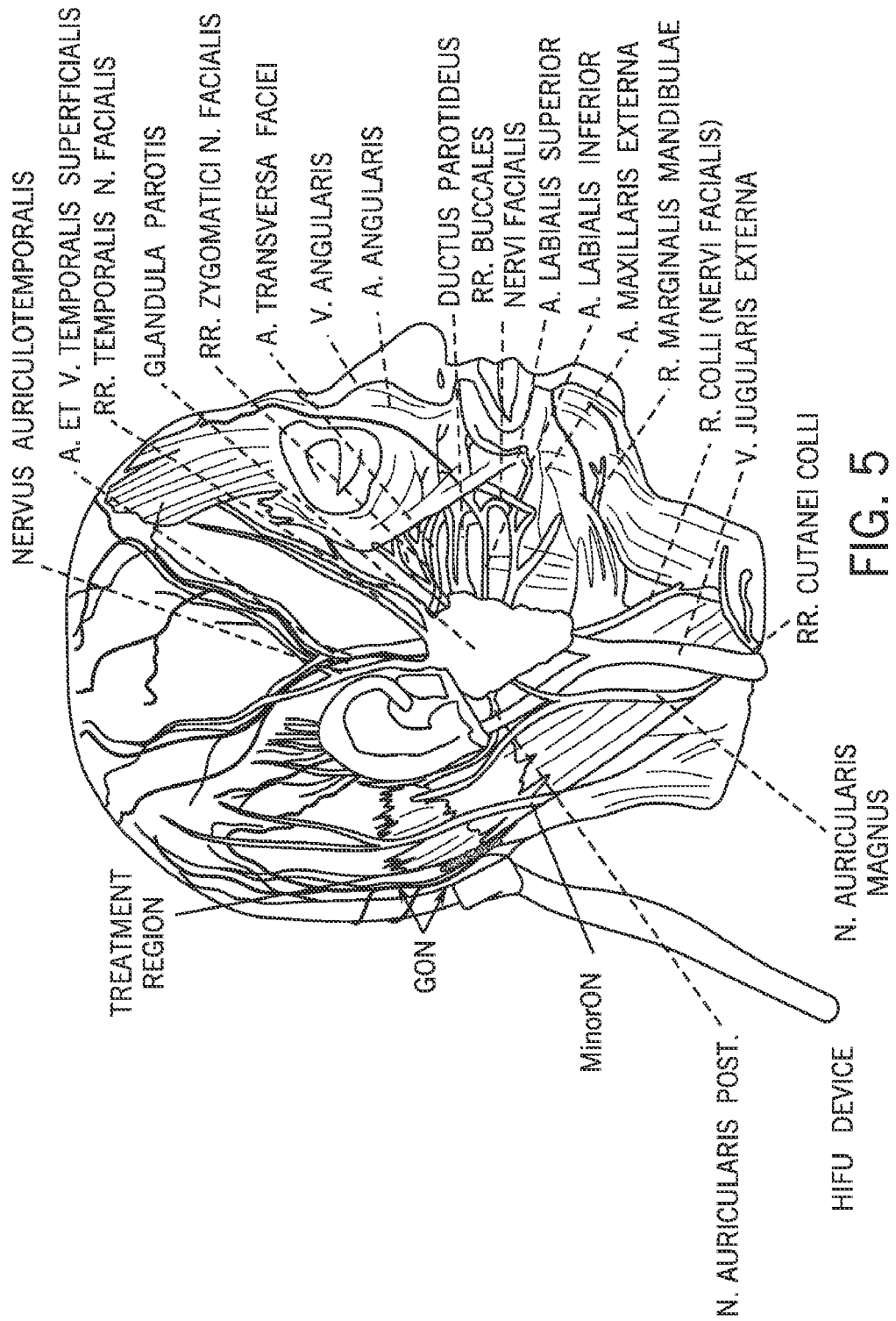

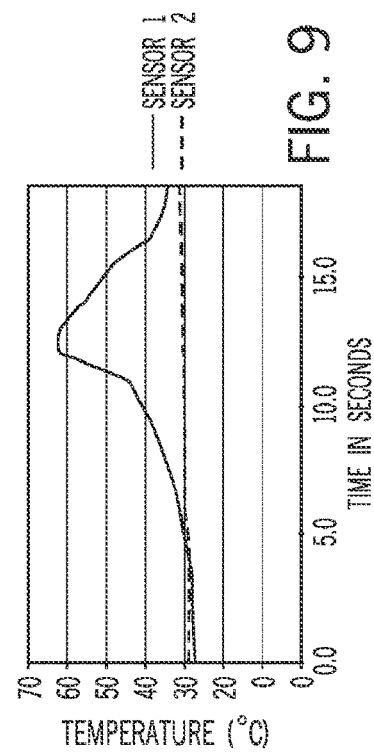
FIG. 7
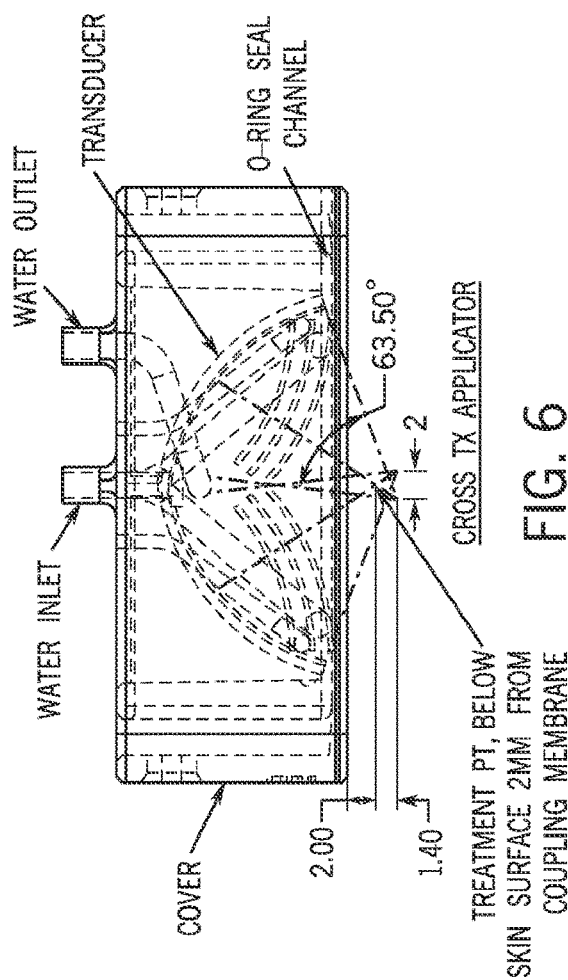
FIG. 6
FIG. 9
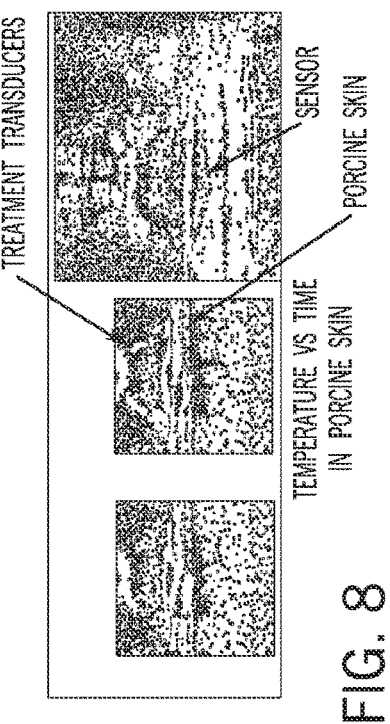
FIG. 8

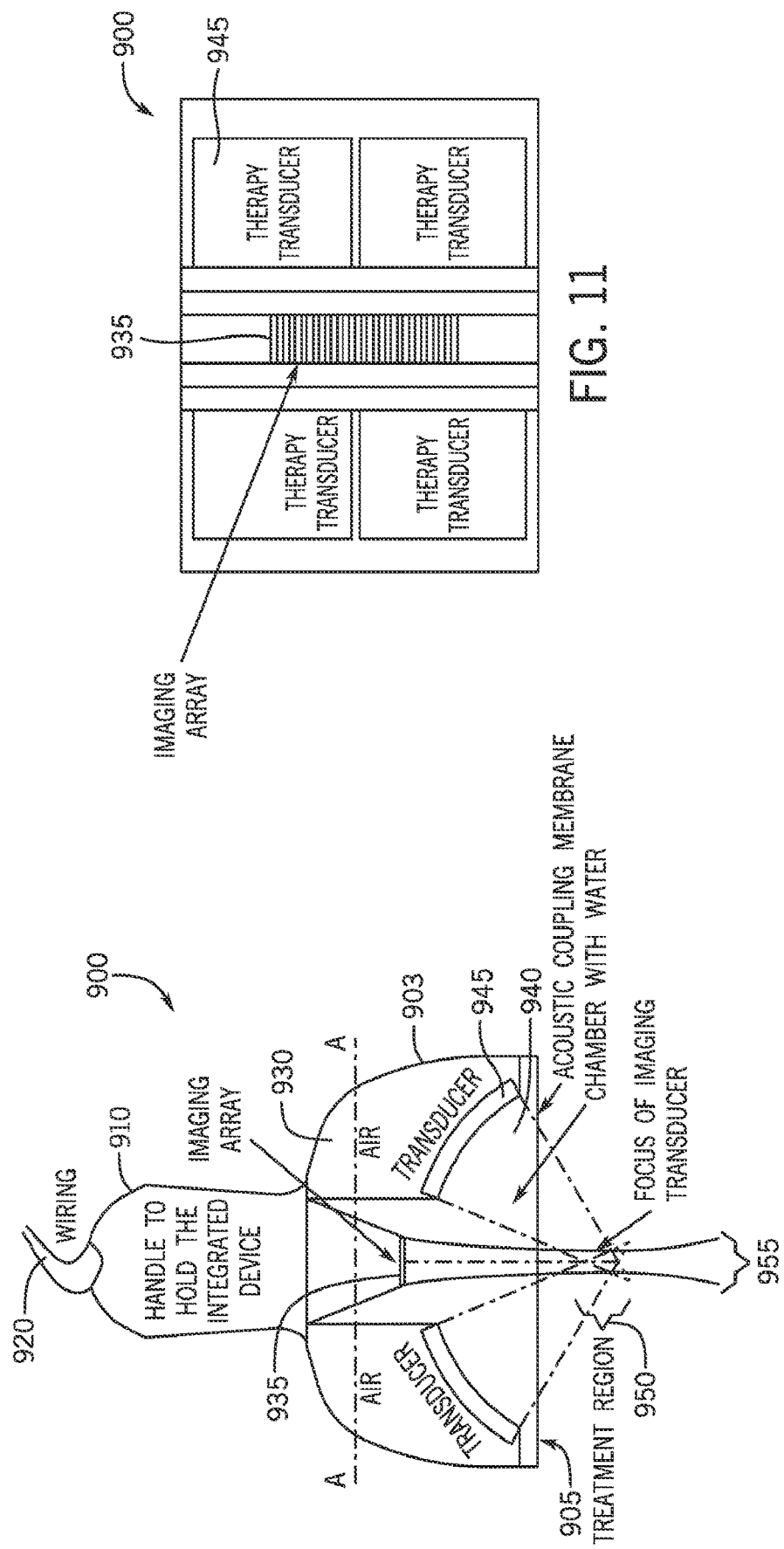

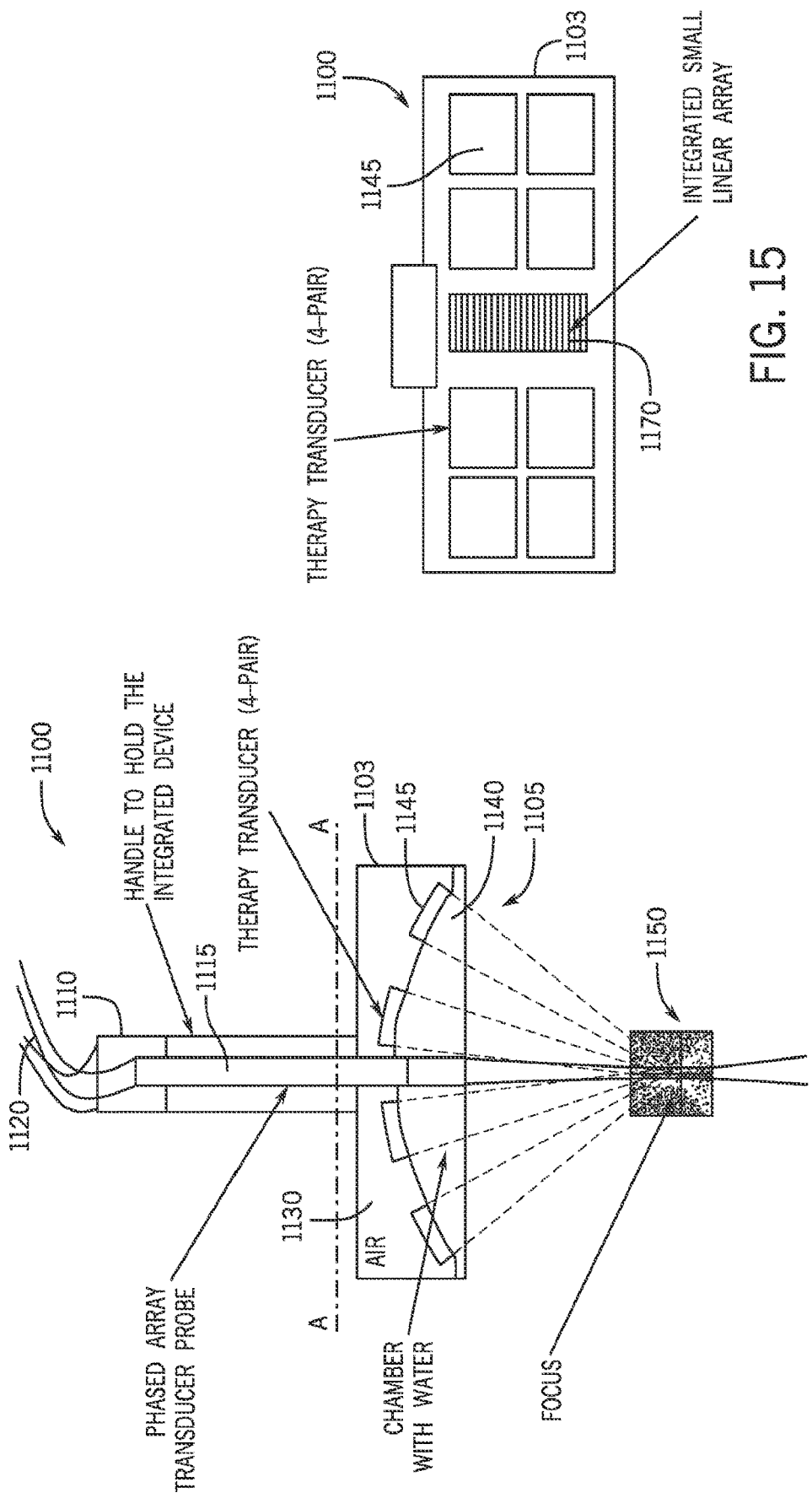

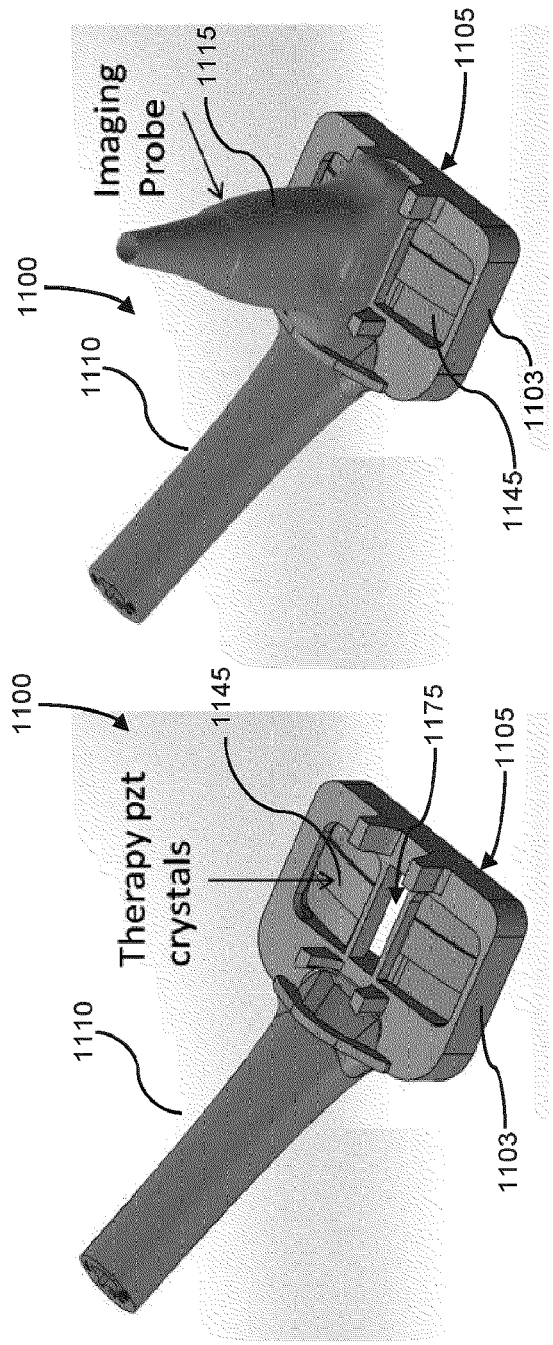
FIG. 16A
FIG. 17
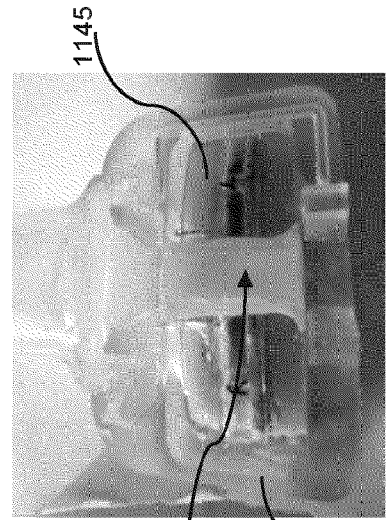
FIG. 16C
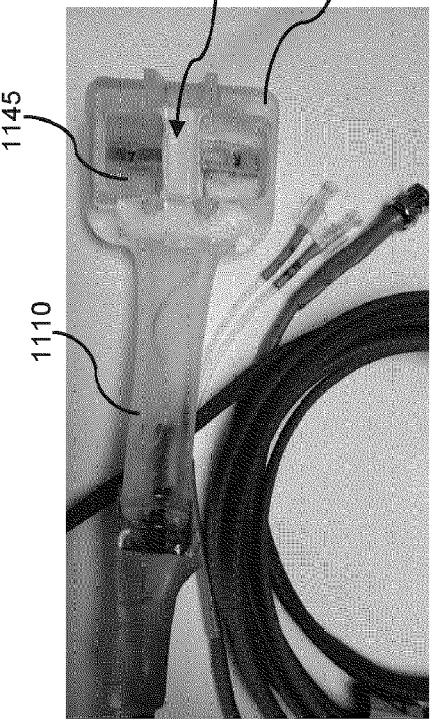
FIG. 16B

IMAGE-GUIDED PULSED VOLUME FOCUSED ULTRASOUND

CROSS-REFERENCE TO RELATED APPLICATIONS

The present application is a U.S. 371 Application claiming priority to PCT Application No. PCT/US2021/014943 filed Jan. 25, 2021, which claims priority to U.S. Provisional Application No. 62/965,109 filed Jan. 23, 2020, the entire contents of which are incorporated herein by reference.

FIELD OF THE DISCLOSURE

The disclosure relates generally to an apparatus and methods for using acoustic energy for controlled thermal therapy of tissues. More specifically, the disclosure relates to the treatment of both benign disorders and cancerous tumors in both humans and companion animals. Example applications include, but are not limited to, treatment of solid tumor cancers (e.g., carcinoma, sarcoma, sarcoids, melanoma, etc.), treatment of skin disorders (e.g. skin cancer, psoriasis, laxity, etc.), treatment of benign diseases or disorders (e.g., collagenous connective tissue of joints such as knees, elbows, wrists, etc.), treatment of localized muscle pain (e.g., hamstring, calves, arms, neck, etc.), and treatment of nervous tissues (e.g., sciatica, localized nerve pain, dorsal root ganglia, chronic neuropathy, etc.).

BACKGROUND

The clinical treatment opportunity is significant in the fields of tumor treatment, treatment of chronic neuropathy, treatment of skin disorders, and treatment of pain (e.g., joints, muscles, migraines, etc.)—including pain that is otherwise unresponsive to traditional treatments. This clinical opportunity is currently being realized to varying degrees via technologies that are readily available for clinical use; however, most existing technologies leave physicians and patients dissatisfied with treatment outcomes, including resultant limitations and negative side effects.

In addition to pharmaceutical treatment methods, existing methods include application of heat or energy (e.g., radiofrequency, laser treatments). Many of these procedures require aggressive cooling at the interface between the treated surface and the treatment device (whether the energy device is externally coupled or is an interventional needle) to provide treatment without desiccating or charring the tissue at the interface with the heating device. In addition, these procedures often inadequately treat the disease target and often treat and injure non-targeted tissues. Furthermore, most energy induction methods have low reproducibility rates of clinical results and outcomes. These low reproducibility rates can be attributed to inherent limitations determined by the physics of the approach, compounded by the physiological responses of the tissue being treated.

Treatment inadequacies notwithstanding, pain remains a nearly ubiquitous ailment that can be experienced in a multitude of forms and can arise for any number of reasons. Joint pain is among the most common pain types, with some national surveys reporting that one-third of adults have experienced joint pain within the past 30 days. Many different conditions can lead to painful joints, including osteoarthritis, rheumatoid arthritis, bursitis, gout, strains, sprains, and other injuries. As a person ages, painful joints become increasingly more common. Joint pain can range from mildly irritating to debilitating. It may go away after a few weeks (acute), or last for several weeks or months (chronic). Even short-term pain and swelling in the joints can affect a person's quality of life.

Generally, physicians first try to diagnose and treat the condition that is causing joint pain. The goal is to reduce pain and inflammation, and preserve joint function. Current treatment options include: medications and therapy devices. Often, nonsteroidal anti-inflammatory drugs (NSAIDs) (e.g., aspirin, ibuprofen, naxproxen sodium, etc.) are prescribed for moderate-to-severe joint pain with swelling. Many NSAIDs have known side effects, including an increased risk of gastrointestinal bleeding. More recently developed NSAIDs, such as Cox-2 inhibitors (e.g., celcoxib) have shown promising pain relief, but most have been removed from the pharmaceutical market due to associated adverse effects, such as increased risk of heart attack, stroke, and other cardiovascular events. Severe pain that cannot be treated by NSAIDS may be treated with opioid drugs; however, opioids can cause drowsiness, constipation, and can become addictive.

Stress on muscles can also be a cause of pain. Current modalities for pain relief often entail medications such as cyclobenzaprine and tizanidine, which are commonly prescribed muscle relaxants. Muscle pain can originate through spasms and/or aching in the neck, legs, and back. Muscle pain can also arise from exertion or overuse, such as from exercise or sustained lifting stress. Typical treatments for muscle spasms and exertion and/or overuse injuries include physical therapy in conjunction with medication.

In addition to pain, there are other disorders that remain common and inadequately treated using existing methods. Currently, treatment options for solid tumor cancers in companion animals (e.g., dogs, cats, horses, etc.) include surgical resection, cryotherapy, hyperthermia, radiotherapy, chemotherapy and photodynamic therapy—each treatment addressing disorders with varying degrees of success. The success of any particular therapy depends highly on the invasiveness of the tumor, how accessible the tumor is, and the feasibility of aggressive tumor ablation. Superficial and smaller tumors are commonly managed through topical application of fluorouracil (5-FU), intralesional chemotherapy (e.g., using cisplatin or mitomycin C), or radiotherapy.

As more members of the "baby boomer" generation age, the number of surgical and non-surgical procedures for treatment of both acute and chronic benign disorders as well as treatment of cancerous tumors continue to increase. Of these procedures, significant advances have been made in the areas of robotic and laparoscopic surgeries, radiation therapy, immunotherapy, chemotherapy, genomic therapy, and combination therapies. Many minimally-invasive interventional needle and catheter based radiological procedures have evolved to deliver a number of different therapeutic agents and methodologies, including but not limited to radiotherapy, targeted chemotherapy, localized thermal ablative therapy, and localized combination therapies. Noninvasive therapies have advanced in predominantly radiation therapy and highly localized high-intensity focused ultrasound therapy. In addition to many surgical tools developed for laparoscopic surgery and robotic surgery, there are numerous energy-based therapies in addition to radiotherapy. These include invasive, minimally-invasive, and noninvasive forms of energy delivery. These energy-based therapy forms include radiofrequency energy, lasers, microwaves, therapeutic ultrasound energy, electroporation, and cryogenic therapy.

Many laser-based systems are on the market with FDA clearance to treat wrinkles and related skin aesthetics, to treat various diseases from tumors, to treat brain tumors using MRI guidance, to treat diseases of the eye, and to rejuvenate skin texture. Lasers treat the target tissues by depositing light energy to heat the tissues. The penetration depth of treatment within the target tissue, however, is limited by the laser wavelength, and region treated is highly dependent upon thermal diffusion and localized blood perfusion.

An alternative heating method is radiofrequency (RF) heating which provides variable heat penetration. RF penetration resulting in localized therapeutic heating is highly dependent upon the localized power density at and near the electrode, the impedance matching to tissue properties, the local blood perfusion, and thermal diffusion of heat from the RF electrode. Typically, treatment volume is limited by all of these factors and any resultant desiccation of tissue immediately adjacent to the electrode. The energy pattern is highly dependent upon surrounding tissue properties and upon local blood perfusion. RF energy can be delivered to skin tissues for aesthetic effect and to tumors for therapeutic effect using either monopolar or bipolar electrode-coupled induction techniques. These systems require the use of active cooling at the interface between the tissue contact and the electrodes to prevent localized burning. Primarily, RF devices are minimally invasive needle-type devices, although flat or curved electrode device configurations are used for open surgeries and for external treatment through the skin to very shallow depths.

Microwave energy is also used for thermal therapy of tissues. In many ways, it parallels some of the characteristics of RF heating methods. The primary differences are that microwave energy propagates through tissue and as the energy travels through the tissue, it is lost to heating the tissues adjacent to the microwave antenna. With microwave energy, there is generally less burning at the tissue-device interface; however, cooling at that interface is required, similar to with RF energy. Generally, microwave energy can treat with deeper penetration and thus larger volume than RF energy; however, the volume of treatment is highly dependent on the microwave frequency used for therapy and the tissue dielectric properties at the treatment frequency. As with RF, microwave energy heating is highly dependent upon localized blood perfusion. In addition, the energy pattern in the tissue resulting from treatment is difficult to control because, in most cases, the wavelength of the microwave energy is very similar to the desired treatment penetration or volume. Furthermore, the tissue itself can dramatically affect the shape and distribution of the energy pattern, and consequently heating, within the tissue.

Electroporation is a technique in which an electrical field is applied to cells in order to increase the permeability of the cell membrane. The increased permeability enables chemicals, drugs, and/or DNA to be introduced into the cell to cause changes within tissue cell membranes, which permit the penetration of agents such as chemotherapeutic drugs. Initial medical application of electroporation was used for introducing poorly permeant anti-cancer drugs into tumor nodules. Gene electro-transfer is also relatively popular as a treatment due to low cost, ease of realization, and safety. Viral vectors can have serious limitations in terms of immunogenicity and pathogenicity when used for DNA transfer. Despite positive treatment results, there are limitations to use of electroporation. It is suited only for enhancing gene- or chemotherapy locally and requires access at the target for placing a high voltage electric field across the target, in addition to requiring a direct vascular supply. Thus, it is a relatively invasive treatment method with limited applications.

Cryogenic therapy involves freezing the diseased or otherwise afflicted tissue to a very low temperature, resulting in cell death within the tissue. This method is most often used to treat kidney and liver tumors.

Externally applied high-intensity focused ultrasound (HIFU) technology has been heavily investigated. There are a small number of service providers (such as Insitec and PROFOUND) offering minimally invasive HIFU surgeries for treatment of various anatomical sites of cancer, as well as treatment of uterine fibroids and palliative treatment of spinal pain. FIG. 1 shows an example HIFU treatment strategy and HIFU device placement for the treatment of a tissue disorder. In FIG. 1, a transducer 110 is used to apply HIFU 120 to a particular treatment region. The applied HIFU 120 results in the creation of a square differential depth zone 115 in this example embodiment, which is comprised of a plurality of lesions 105. Specifically, FIG. 1 shows the creation of a 1 cm$^2$ square by 1 cm differential depth zone.

Challenges associated with HIFU include its long treatment time, which in on the order of hours due to the numerous individual small focal spots, and requires a patient to be under general anesthesia and thus increases patient risk. Moreover, HIFU technology targets a treatment region from outside the body, focusing the insonation to the target region through an ultrasound (US) "entrance window. As a consequence of the application method, the US "entrance window" may include non-target tissues that receive excessive thermal dose. HIFU may require using MR image guidance for targeting a treatment region and, in some cases, MR thermal imaging for temperature monitoring. The use of MR imaging increases the treatment cost significantly. Moreover, such treatment cannot be provided in facilities where there are no MRI systems available (or are unavailable for lengthy procedures) to control the HIFU treatment delivery to the proper target location without damaging other non-targeted tissues.

There numerous variations in High Intensity Ultrasound technologies, which include cellular disruption and/or acoustic stimulation to heat tissue. Although HIFU is a common and, sometimes predominant, term used to describe the application of acoustic energy for thermal therapy applications, there are several additional variants in this field. Actually, HIFU is specific to a particular method of delivery of acoustic energy, and does not encompass all methods to use ultrasound for treatment.

There are five conventional variations to therapeutic applications of ultrasound:

(1) Low intensity, low frequency stimulation of bone tissue to encourage bone healing or to increase membrane permeability for the purpose of increased membrane transport of chemical agents.

(2) High intensity, low frequency application to affect cellular disruption. The primary applications for this family of devices are for disruption of fat cells in liposuction or disruption of thromboses in vascular structures.

(3) Low intensity, high frequency application to affect therapeutic heating for muscle soreness. A variety of products in the field of sports medicine have been employed for years.

(4) High intensity, high frequency application to produce molecular agitation and directly interact with the high frequency mechanical properties of the tissue to produce localized heating within a desired therapeutic zone:
   a. The delivery approaches vary, and the use of hemispherical focused transducers is incorporated in the prior art products, and this is the typical HIFU. These include products for "spot" ablation of cancerous tissue and Benign Prostate Hyperplasia (BPH), creating cardiac lesions to treat atrial fibrillation (E), and tissue dissection/tissue welding.
   b. Technology that uses tubular and curvilinear soft-focus and line focus transducer technology in both singular and array structures to create a customized shaped volume region of therapy. This can be achieved through explicit transducer design on an a priori basis and using multiple element designs integrated to permit dynamic adjustment of the therapeutic size and shape, dependent upon the specific tissue treated. Thus, volumetric heating of customized shapes and sizes can be achieved. For mid-size and larger regions, this permits treatment times that are much shorter than achievable with HIFU "step focused" systems. Further, the control of the customized shape and treatment volume is exquisite, permitting an exact lesion size or treatment region to be created.
   (5) Acoustic Shock Wave Lithotripsy (ASWL) for disruption of calcium deposits such as kidney stones and bone spurs.

Regarding methodology 4(a) above, (HIFU) approaches use hemispherical or partially spherical transducers to create focal points of energy. This approach works well when the desired result is to create a "cigar-shaped" lesion as the approach would produce a very high intensity energy density in the lateral cross section at the focal depth with a focal length of approximately eight times the lateral focal cross section which is centered at the focal depth. An example would be an external or intracavitary transducer focused at a depth of 3 cm that has a focal zone with a 1 mm cross section and a focal length of 8 to 10 mm. Depending upon the frequency, focal length, focal gain and input power, it is possible to create extremely high power densities at the center of each focal zone. Exquisite control of such energy using real-time, spatially-registered imaging is a requirement to deliver treatment that doesn't leave "gaps" laterally and doesn't seriously injure nearby normal tissues.

Creating a volumetric lesion with standard HIFU approaches would require the creation of multiple small lesions to cover the desired lateral cross section. As an example, a 1 cm 2 square lateral region would require approximately eight half-power-width overlapping zones in both lateral directions, producing a 1 cm×1 cm lateral by 1 cm depth zone of temperature elevation. This would require the creation of 64 separate focal zones. Treatment using such an approach would be slow (approximately 60 seconds for a 1 cm region) and non-uniform in treatment. Larger treatment volumes require even longer time to create the necessary treatment pattern. For treatment volumes of several centimeters laterally and in depth, the time required would be significant, and accurate targeting would require MM imaging for targeting and MR thermal imaging (MRTI) for thermal monitoring and treatment control.

When affecting a thermal increase in deeper tissue while leaving the tissue adjacent to the applicator probe relatively unaffected, focused ultrasound technology is intrinsically superior to radiofrequency methods for two reasons:

(1) The electrical properties of various tissue types (subcutaneous fat, fibrous septae, and muscle) vary much more than the acoustical properties of those tissue structures. This is because the electrical properties are dominated by water and electrolyte (salt) content, whereas the acoustic properties are predominately dependent on density differences. The result in this wider variation is that the tissue resistivity. Therefore, RF energy is not uniformly absorbed by the tissue below the application probe and is dependent on local power density, current path variations, and thermal diffusion in perfused tissue.

RF power is not propagated through the tissue. RF is resistive in absorption, i.e. like connecting a network of resistors in a series-parallel combination across a big battery and heating the resistors along the available current pathways. Any propagation of the resultant heat is due to the thermal conductivity of the tissue. Any propagation of the resultant heat to nearby tissue is due to the thermal conductivity of the respective tissue. Small variations in tissue composition and variations in blood perfusion, therefore, can dramatically affect the electrical properties of the tissue and the energy absorption profile with RF treatment (and thus the treatment efficacy) of the underlying tissue. This phenomenon will be discussed in greater detail below.

With a more consistent energy absorption profile from energy that is propagated through the tissue (with ultrasound) the energy absorption (and treatment efficacy) are more uniform and predictable.

(2) Because RF is a resistive heating phenomenon, dependent on the current density in the tissue, most of the RF induced heating occurs directly at the electrode/skin interface. Between 50% and 90% of the current (thus resistive heating) occurs in the 750 um to 1 mm of the electrode-tissue interface (a region which must be cooled to prevent burning or tissue charring). This means that most of the energy is dissipated and unproductive. Not only is this inefficient, but if there is a variation in tissue characteristics in the region within and below the cooled zone, dramatic changes in energy disposition to the region outside of the cooled zone could occur. Paths of high tissue conductivity next to those that are more resistive produce widely varying RF absorption patterns, often dramatically affecting resultant heating patterns.

To illustrate this point further—if 75% of the energy is supposed to be dissipated in the cooling process, then only 25% of the energy is delivered to the region to be treated. If the low resistance components (saline, etc.) are twice as prevalent in the 750 um surface zone, then more energy (than expected) will be delivered to the deeper zone. Since there is no consistent means of monitoring where this energy is deployed, there could be rapid heating and tissue overtreatment in some areas and under-treatment in others within this region.

In some existing systems utilizing ultrasonic therapy, such as the TheraVision® system and the Acoustx® treatment delivery applicator, the technology overcomes the aforementioned limitations associated with RF induced therapy, as well as the small treatment spot size limitation of HIFU. The high-intensity ultrasound system, via a needle or catheter based therapeutic ultrasound applicator, can deliver an ablative thermal dose to a tissue volume—with a range of 1 to 60 cc. Small volumes require from typically 30 seconds to several minutes for treatment, and larger volume targets require 10-15 minutes of treatment. Because of the tissue acoustic properties, energy absorption and resultant therapy is more uniform than other modalities and with shorter times, which reduces the time the patient is under either analgesia or anesthesia. The applicator (small 1-3 mm diameter catheter or needle) may be inserted into a tumor typically under ultrasound imaging guidance, thus eliminating the need for costly MR image-guidance and once in position, does not require continuous image-guidance throughout the treatment, because the catheter 'tracks' with the target tissue.

FIGS. 2A-F show example high-intensity ultrasound applicator configurations, including several different implementations of needle and catheter based treatment devices. FIG. 2A shows various applicators for interstitial use. FIG. 2B shows applicators used for directional intraluminal transurethral use. FIG. 2C shows flexible, long transvascular directional applicators. FIG. 2D shows a tip of an intraluminal transvascular applicator with MR tracking coils for imaging guidance. FIG. 2E shows a distal end of an HIFU ablation catheter at various stages of motion produced by manipulation of guidewires at the proximal end of the catheter. FIG. 3 shows an example ablation system (TheraVision®) with multiple channel generators, image acquisition tools and processing algorithms, therapy control algorithms, water circulation system, and thermometry. Existing applicators incorporating curved transducers to provide two different broad focal zones that may be used to administer high-intensity ultrasound therapy are shown in FIG. 4. In the various high-intensity ultrasound application implementations, different power and focus configurations of device operation can provide for selective, controlled heating within different temperature ranges, focal zone sizes, and penetration depths to provide intended results in the target tissue. Suitable treatment ranges are dependent on pre-stressed tissue, such as in-vivo intervertebral discs or joint cartilage. In particular, treatments approaching and above 70° C. can be used for structural remodeling, whereas lower temperatures can achieve soft tissue tumor ablation or pain relief responses without appreciable remodeling.

Despite the existing energy-based treatments for disorders in humans and companion animals that range from pain to cancerous tumors, none are capable of treating tissue precisely and at deeper depths with the exception of HIFU under MM guidance for certain anatomical locations. Thus, it would be advantageous to propose an apparatus and method for noninvasively providing therapeutic energy to deep tissues in precise locations that can be guided by multiple imaging modalities and without the expense and limitations of conventional HIFU. The present invention provides such an apparatus and methods in its many various embodiments.

SUMMARY

One embodiment of the present disclosure is an external volume-focused ultrasound (VF-FUS) therapeutic applicator device that implements low intensity focused ultrasound (liFUS) for external treatments delivered at an interface between the device and an external surface on the treatment recipient. The device includes a handle that is coupled to a main body. The device houses an array transducer probe that is disposed within the handle and extends through the main body to an imaging array. The main body includes a chamber and connected pathways disposed therein, which enable water circulation to cool the device and the application surface on the treatment recipient. The main body also houses sectored lead zirconate titanate (PZT) crystals for therapy ('therapy transducers"). The device also includes pathways disposed therein for water circulation to cool the device and the device-surface interface. In various embodiments, the array transducer probe may be phased or not phased.

In one embodiment, an apparatus comprises a source of ultrasound energy comprising a plurality of ultrasound transducers. Each of the plurality of ultrasound transducers is configured to direct ultrasound energy to a treatment region located at a depth below a skin surface associated with a patient. The apparatus further comprises a control system for controlling power to the plurality of ultrasound transducers and a water circulation system for controlling a temperature associated with the plurality of ultrasound transducers. The apparatus further comprises an imaging transducer for spatially registering the location of the treatment region.

In another embodiment, an apparatus, comprises a handle coupled with a source of ultrasound energy, and a main body. The main body comprises a bottom portion having a bottom surface configured to interface with a skin surface associated with a patient, and a top portion having a first recess and a second recess. The first recess is configured to engage with the handle and the second recess is configured to engage with an imaging transducer. The imaging transducer is configured to spatially register a location of a treatment region located at a depth below the skin surface. Each of a plurality of ultrasound therapy transducers is configured to direct ultrasound energy to the treatment region. A first support structure is disposed between the top portion and the bottom portion and positioned on a first side of the imaging transducer, and is configured to engage with a first group of the plurality of ultrasound therapy transducers. A chamber is formed by the support structure and the bottom surface of the bottom portion and is configured to facilitate water circulation.

In yet another embodiment, an apparatus is configured to deliver ultrasound energy to a treatment site of a patient. The apparatus includes a bottom portion having a bottom surface configured to interface with a skin surface associated with the patient, and a top portion having a recess configured to engage with an imaging transducer. The imaging transducer is configured to spatially register a location of the treatment site. A plurality of therapeutic ultrasound transducers is configured to direct ultrasound energy to the treatment site. A support structure is disposed between the top portion and the bottom portion and is positioned on a side of the imaging transducer. The support structure is configured to engage with the plurality of ultrasound transducers.

In some embodiments, the device main body includes therapy transducers that are arranged radially relative to the imaging array, wherein the imaging array is located within a substantially central portion of the main device body. In various embodiments, each of the therapy transducers are configured to be located at a pitch angle relative to the treatment surface. In various embodiments, the therapy transducers may each have the same pitch angle, different pitch angles, or a combination thereof.

In some embodiments, the device main body includes therapy transducers that are arranged in pairs on mirroring sides of the imaging array, wherein the imaging array is located within a substantially central portion of the main device body and contains a plurality of integrated linear array transducers.

In other embodiments, the device main body includes therapy transducers that are arranged in grids on mirroring sides of the imaging array, wherein the imaging array is located within a substantially central portion of the main device body and contains a plurality of integrated linear array transducers.

In some embodiments, the device main body includes therapy transducers that are arranged in a substantially linear configuration on mirroring sides of the imaging array, wherein the imaging array is located within a substantially central portion of the main device body and contains a plurality of integrated linear array transducers.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which:

FIG. 5 shows an illustration of a prospective VF-FUS method, wherein an external device or applicator may be used to noninvasively apply FUS to an occipital nerve at the appropriate intensity to illicit maximum beneficial response.

FIG. 6 shows adjacent focus separation of 4 mm and focal depth of 3-4 mm for dual beam and cross beam ultrasound therapy applicators.

FIG. 7 shows cross-beam power intensity patterns for focal separation of 2 mm, focal depth of 2.5 mm, and 2.24 mm transducer spacing for dual and cross beam ultrasound therapy applicators.

FIG. 8 shows an ultrasound image of array and arcuate treatment transducers above tissue sample atop a tissue phantom, wherein the image is taken from beneath the phantom.

FIG. 9 shows a time-temperature profile of sensors placed within a treatment region of a tissue sample and placed immediately adjacent to the treatment site with a peak of 64° C. in the treatment region at 10 seconds after power-on and 31° C. outside the treatment region.

FIG. 10 shows a side cross-sectional view of an ultrasound therapy applicator incorporating a central imaging array, according to an exemplary embodiment.

FIG. 11 shows a top cross-sectional view of an ultrasound therapy applicator incorporating four therapy transducers and with centrally located imaging array, according to an exemplary embodiment.

FIG. 14 shows a side view of a FUS applicator and an illustration of a corresponding focus, according to another exemplary embodiment.

FIG. 15 shows a top cross-sectional view of the FUS applicator shown in FIG. 14, according to an exemplary embodiment.

FIG. 16A shows a perspective view of a FUS applicator, according to another exemplary embodiment.

FIGS. 16B-16C show a top view of the FUS applicator of FIG. 16A.

FIG. 17 shows a perspective view of a FUS applicator of FIG. 16A with a coupled imaging probe, according to another exemplary embodiment.

Figure 1:
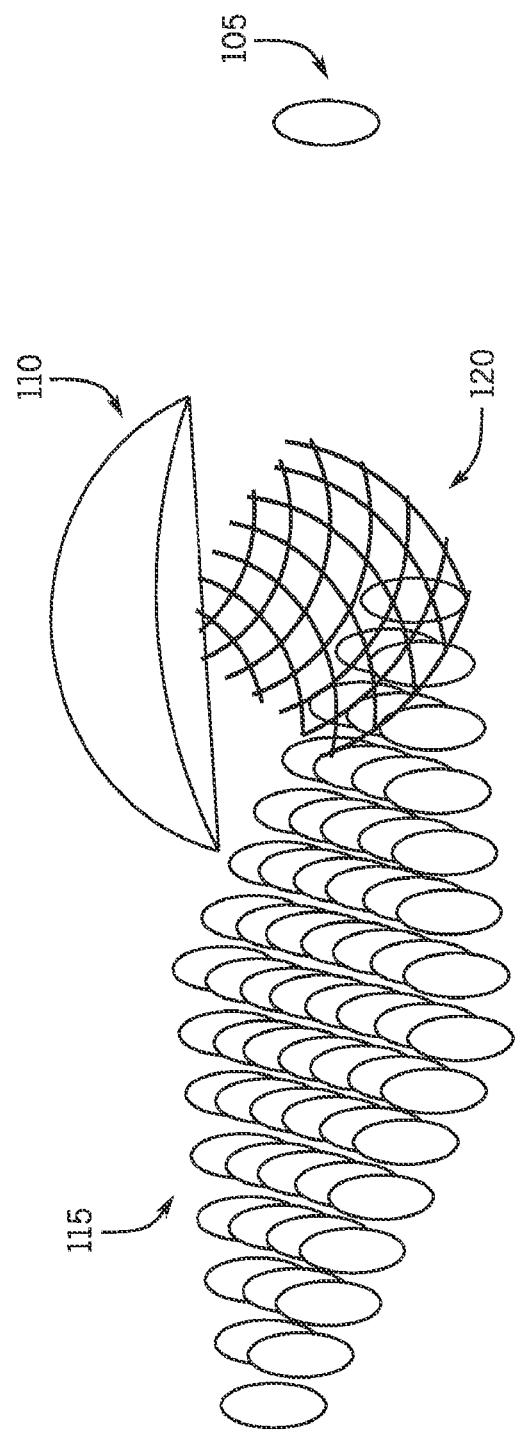
FIG. 1 is an illustration of an example treatment strategy using high intensity focused ultrasound (HIFU).
Figure 2B:
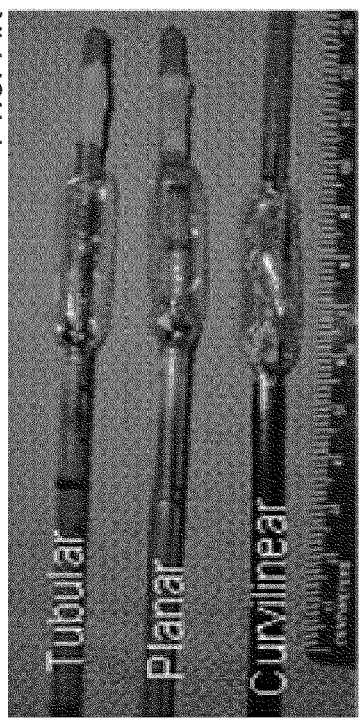
FIGS. 2A-2E show example therapeutic ultrasound applicators in different configurations and for different applications.
Figure 2D:
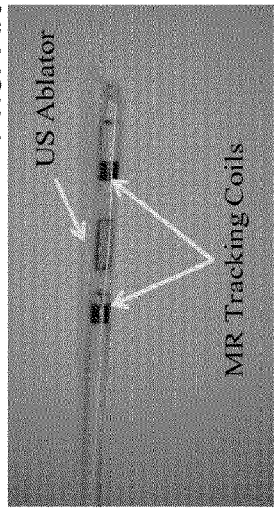
Figure 2A:
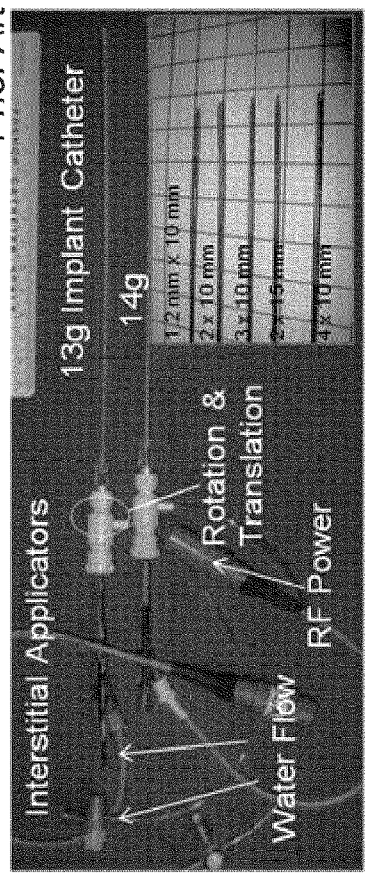
Figure 2C:
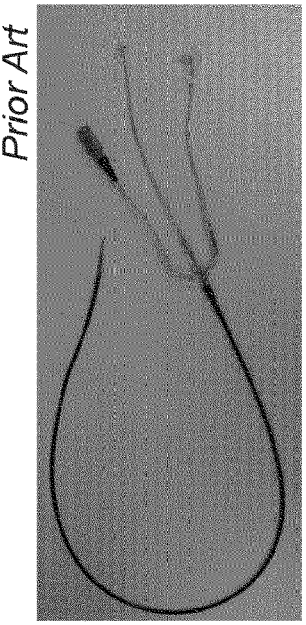
Figure 2E:
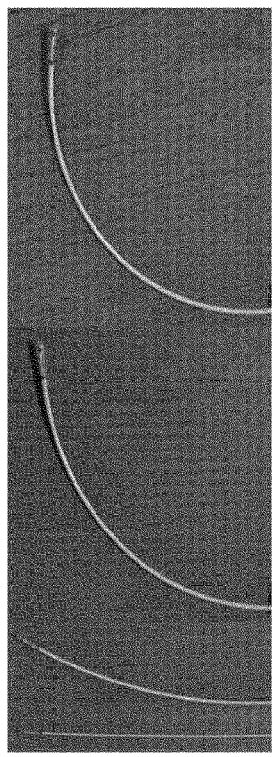

In describing the preferred embodiment of the disclosure which is illustrated in the drawings, specific terminology will be resorted to for the sake of clarity. However, it is not intended that the disclosure be limited to the specific terms so selected and it is to be understood that each specific term includes all technical equivalents which operate in a similar manner to accomplish a similar purpose.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure and the various features and advantageous details thereof are explained more fully with reference to the non-limiting embodiments described in detail in the following description. The paragraphs below contain several examples of uses of the disclosure. These are examples and are not limiting as to the uses for the subject disclosure.

In a preferred method and system of the present disclosure, various configurations of focused ultrasound (FUS) may be implemented to treat a precise subdermal location associated with a treatment recipient. In various embodiments, the volume focused ultrasound (VF-FUS may be administered through various configurations of applicators. Intensity of VF-FUS is adjustable to the level appropriate for the treatment application. For example, low intensity focused ultrasound (liFUS) can be used for neuromodulation, and high intensity focused ultrasound (HIFU) can be used for soft tissue coagulation or tumor ablation.

Figure 4:
FIG. 4 shows a prototype of existing volume-focused HIFU applicators, each having a distinct volume-focus pattern.
Figure 3:
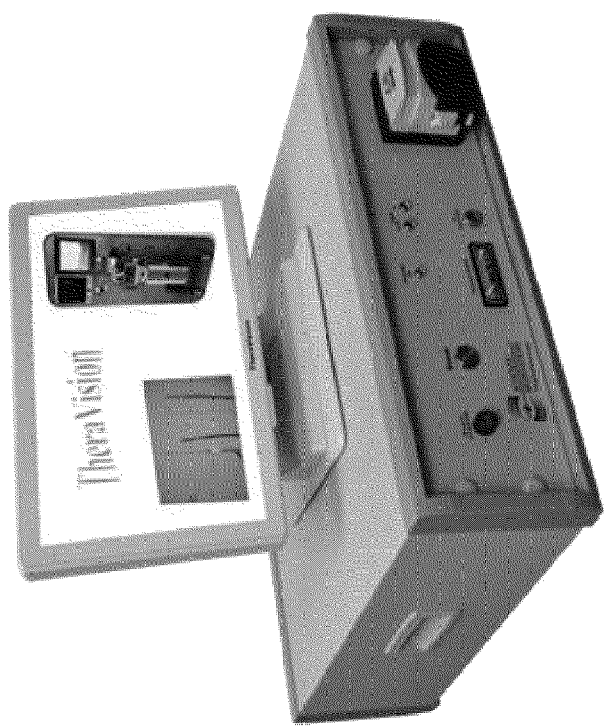
FIG. 3 shows an existing ablation control and generator system to which HIFU or other types of therapeutic ultrasound applicators may be connected.

VF-FUS can non-invasively pulse modulate thermal energy to treat headaches with less variability of response, increase durability, and potentially provide improved outcomes. FIG. 5 shows an illustration of a prospective VF-FUS method, wherein an external device or applicator of the type shown in FIG. 4 may be used to noninvasively apply VF-FUS to an occipital nerve for the treatment of migraines or other related disorders. Additionally, the VF-FUS device of FIG. 4 can be used to selectively treat peripheral nerves which produce pain in the arms or lower limbs. Specifically, external VF-FUS, differs from typical HIFU devices in that it can be directed readily to a conformal target region and the zone of treatment can be precisely controlled. In various embodiments, the VF-FUS device looks similar to a diagnostic ultrasound probe used commonly in the clinic and is non-invasively able to pulse modulate the occipital nerves or nerves associated with joint pain to produce a therapeutic effect within a few minutes. This therapy could effectively treat a larger number of patients (including migraines, and other pains including joint pain and muscle pain) than current therapies at a reduced cost for a longer period of time and could be used for retreatment when necessary. Embodiments of the VF-FUS device may be used in an outpatient setting without the need of any costly equipment. In addition to the VF-FUS device itself, additional features and design modifications will allow non-invasive temperature and tissue change monitoring and pulse modulation of therapeutic delivery. This has been successfully performed and tested in a rodent chronic migraine model and safety and neuropathic changes were assessed (De la Cruz et al., *Neurosurgery*, 2015, 77, p. 6; Walling et al., *Brain Res.* 2018, 1699, p. 135-141).

Figure 36:
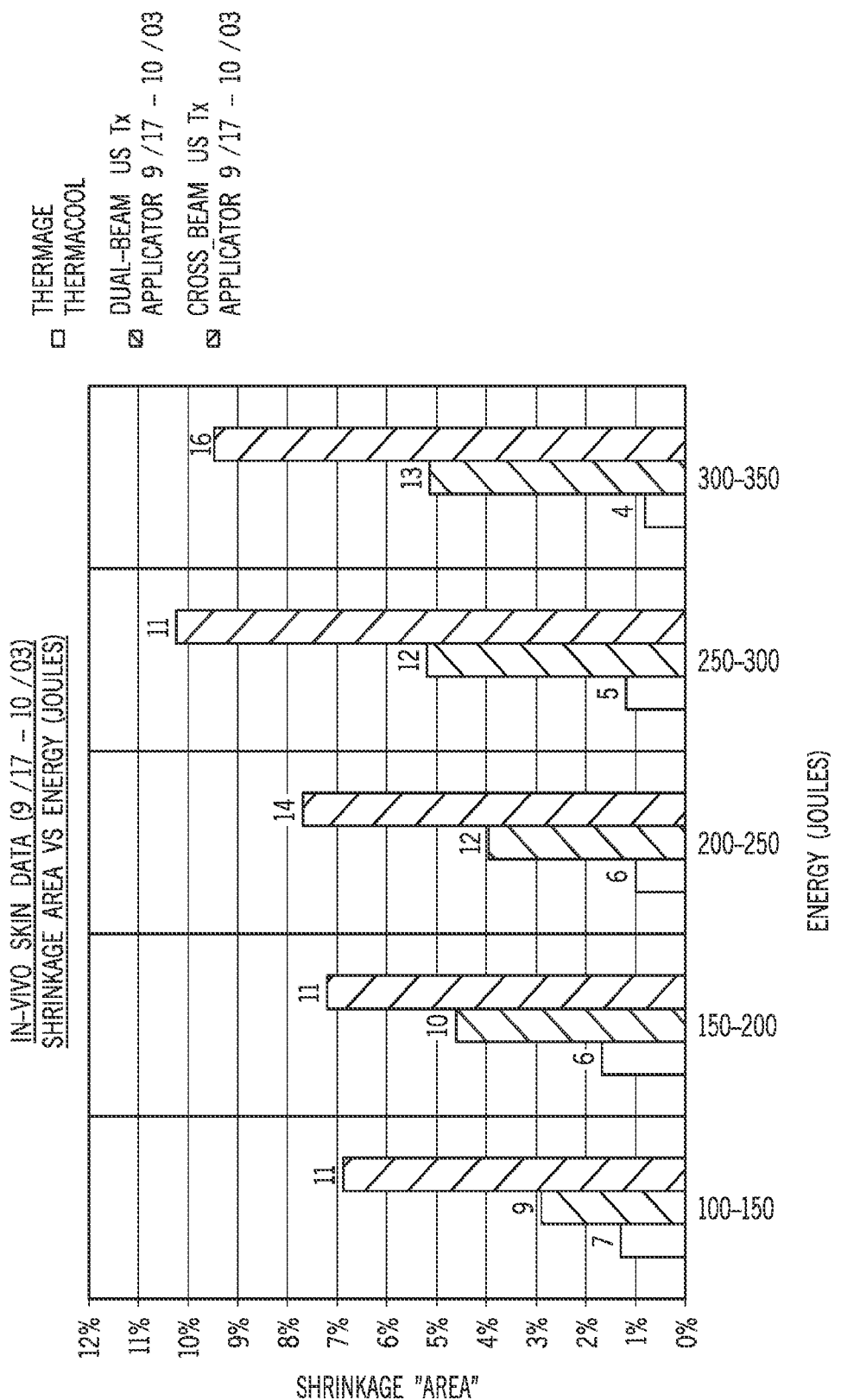
FIG. 36 shows skin shrinkage area vs. energy from an in-vivo experiment using dual beam applicators.

Experimental evidence has shown that VF-FUS may be used to treat tissue at a focal depth that is controllable based on ultrasound beam positioning. Referring now to FIG. 6, a diagram of a dual-cross beam therapy applicator is shown. The applicator was used to for VF-FUS treatment of a specified tissue region during a controlled experimental procedure. The applicator configuration corresponds to a focus separation of 4 mm and focal depth of 3-4 mm, illustrating the precision capabilities of cross-beam applicators. FIG. 7 further illustrates the precision capabilities of cross-beam applicators. FIG. 7 shows thermal patterns associated with a cross-beam therapy applicator, with a shown focal separation of 2 mm, focal depth of 2.5 mm, and 2.24 mm transducer spacing. Accuracy of a cross-beam therapy applicator can be enabled by image guidance. FIG. 8 shows example ultrasound images of an array of arcuate treatment transducers above a tissue sample (atop a tissue phantom), which may be used during treatment administration to locate an appropriate treatment focal depth. FIG. 9 shows a temperature-time profile generated by sensors placed within a region of tissue undergoing VF-FUS treatment and within a region immediately adjacent to the treatment site. FIG. 9 shows only a peak temperature of 64° C. after 10 seconds of treatment, illustrating the limited exposure of tissue surrounding the treatment region. Use of these devices has shown application in the treatment of skin disorders and for tightening of loose skin. FIG. 36 shows the effect of skin shrinkage and tightening represented by marked skin surface area reduction for the dual-beam and cross-beam VF-FUS applicators as compared to RF treatment.

VF-FUS methods show promise in a multitude of medical applications. The liver is a common site of metastasis from many gastrointestinal and extra-gastrointestinal primary cancers, including breast, lung, esophagus, stomach, pancreas, kidney and melanoma. In addition, the liver itself may exhibit conditions that are difficult to treat (e.g., hepatocellular carcinomas or intrahepatic cholangiocarcinomas), which are often surgically unresectable at the time of diagnosis as they are most often detected quite late with reduced liver function. As such, the liver is an excellent target organ site to apply VF-FUS treatment strategies in an effort to improve survival and quality of life. Embodiments of the VF-FUS therapeutic ultrasound applicator provide a new tool for noninvasive treatment of liver cancers for sites in lobes where the ultrasound energy can be applied, for example, either beneath or between ribs. Additionally, VF- FUS can be used conjunctively with other therapies that may be delivered minimally invasively as well.

In order to better understand the scope of VF-FUS device embodiments and methods, it is helpful to understand the types of treatable tissues, corresponding tissue afflictions, and issues associated with treatments. It has long been known that damaging collagen will cause shrinkage and neocollagenesis (rejuvenation). It has been shown that the physiology will allow excellent clinical results that will allow physicians and device companies to serve patients profitably—but they have also proven that those results are often inconsistent. In some cases the clinical outcome is dramatic, whereas in others it is imperceptible. In yet others cases, the end result can be worse than the initial condition (significant burns, overshrinkage and loss of form). The cause of these inconsistent clinical results is related to the types of technology applications that apply the thermal energy with these devices—which are, themselves, inconsistent. The goal of the treatment for skin therapy is to heat the underlying tissue (dermis), and some of the deeper tissue, at temperatures ranging from 55° C. to 70° C. for a short period of time while leaving the surface (epidermis) and underlying tissue unaffected. Existing technologies are not able to accurately control where they apply the therapeutic treatment, depth of penetration, or how much therapeutic energy is absorbed by the target region. The results in FIG. 9, FIG. 37, and FIG. 38 demonstrate the ability to control the focal zone of the disclosed embodiments of VF-FUS accurately for subcutaneous therapy.

Embodiments of the herein described VF-FUS device will be applicable to treat both small and large superficial, subcutaneous, and deeper tumors using an image-guided handheld therapeutic ultrasound applicator and incorporating ultrasound image guidance. This novel therapeutic modality has several clear advantages. Local administration to cutaneous lesions will not require general anesthesia as sedation and regional anesthesia will be sufficient. Thermocouple-monitored and -guided delivery will minimize collateral damage to adjacent tissues and structures, which is a substantial problem associated with intralesional administration of chemotherapeutics. Focused ultrasound is non-invasive, so inadvertent seeding of surrounding tissue with tumor cells, as can occur during surgical debulking, will be minimized or eliminated. The portable format of a VF-FUS device will support this therapy as ambulatory procedures, which will substantially reduce costs and expand the therapeutic capacity of practitioners for treating localized tumors in as an outpatient procedure. Finally, VF-FUS can be administered serially as required to achieve incremental tumor ablation with minimal cumulative morbidity to the patient.

Use of VF-FUS may also be applicable for equine sarcoid and squamous cell carcinoma (SCC) skin tumors, and for tumors which have invaded deeper tissues and organs. Further, VF-FUS treatment application can be extended to treatment of localized tumors in other companion animals, such as dogs and cats. In various embodiments, the VF-FUS device may configured to have a "wand" shape and may be handheld to enable direct application of ultrasound treatment to a tumor surface. In various implementations, ultrasound treatment via a VF-FUS device may be conducted in sedated equine patients combined with local anesthesia, and guided by concurrent ultrasound imaging to ablate cutaneous tumors in equines. In similar implementations, a VF-FUS device may be used to treat deeper tumors such as sarcomas and/or liver and renal carcinomas in horses (and other companion animals) from the sub-dermis to a depth of 10 cm, dependent upon the focal depth zone prescribed by activating specific frequency transducers within the VF-FUS applicator.

Sarcoids and SCCs are among the most common types of equine tumor. A wide range of treatments, of varying cost and technological complexity, have been applied to these cutaneous tumors; however, no therapy has been consistently successful and recurrence is very common. Focused ultrasound is a highly promising therapeutic modality for treating these tumors. Ultrasound treatment, specifically liFUS (such as VF-FUS), can be administered repeatedly to a patient on an 'as needed' basis and with minimal risk of cumulative morbidity. In various embodiments, the VF-FUS device may be configured to have a "wand" shape and contain a plurality of transducers to enable stall-side delivery of treatment to equine patients in an ambulatory field setting, which avoids the need for a referral to tertiary veterinary hospitals, or for general anesthesia. As VF-FUS does not ablate non-targeted tissue, it results in minimal collateral tissue damage. Various embodiments of the herein disclosed VF-FUS device have the potential to benefit numerous prospective patients, including horses, as VF-FUS treatment would avoid the need for surgical resection and/or chemotherapeutic intervention.

Various embodiments of the herein VF-FUS disclosure can be used to treat localized solid tissue tumors in either humans or companion animals at different penetration depths in tissue. In various embodiments, the penetration depths may range from superficial (0.5 cm) to as much as 10-12 cm. The concept is to incorporate arrays designed at one or more frequency of operation and beam cross-section at the focus, and to use those to produce a focal zone of specific depth and cross-sectional width.

It can produce therapeutic focal zones over a range of lateral cross-section dimension from 3 mm to 12 mm; it can produce focal depths from 0.5 cm to 11 cm. These ranges are dependent upon the specific configuration of the applicator transducer elements with respect to curvature, relative location with respect to each other, number of elements, and frequency (or frequencies) of the therapy transducers. Embodiments of the herein VF-FUS disclosure may deliver targeted conformal ultrasound-generated therapy ranging from hyperthermic to ablative. Embodiments of the herein VF-FUS disclosure may also be used to treat any localized solid tissue tumors in either humans or companion animals at penetration depths in tissue between superficial (0.5 cm) and as great as 10-12 cm.

FIG. 10 shows a side view of a VF-FUS device 900, according to exemplary embodiments. The VF-FUS device is provided power via by wires 920, which are coupled to a handle 910. The handle 910 is coupled to a main body 903. A surface 905 on main body 903 is configured to interface with a surface of a VF-FUS treatment patient or recipient. Disposed within main body 903 is a chamber 940 to facilitate water circulation within the main body 903 on the face of contained therapy transducers 945, which are used to emit energy for treatment in a treatment region 950. In addition, the main body 903 contains chambers 930 filled with air, therapy transducers 945, and imaging array 935. The imaging array 935 has a focus range 955. The transducers 945 are configured within main body 903 to treat a region 950 below surface 905.

FIG. 11 shows a top cross-sectional view of the device 900, according to an exemplary embodiment. FIG. 11 illustrates the arrangement of therapy transducers 945 and imaging array 935 within main body 903.

In various embodiments, device 900 is a hand-held device. In other embodiments device 900 is coupled to a positioning-arm. In other embodiments, device 900 is a therapeutic ultrasound device that can be used externally for localized ablation of shallow soft tissues with treatment depths of 4-7 cm. In various embodiments, therapy transducers 945 may each operate on the same frequency, on different frequencies, or a combination thereof. Though FIG. 10 shows 4 therapy transducers, various embodiments of device 900 may include any number of therapy transducers within main body 903. In various embodiments, therapy transducers 945 may operate synchronously or asynchronously.

Figure 12:
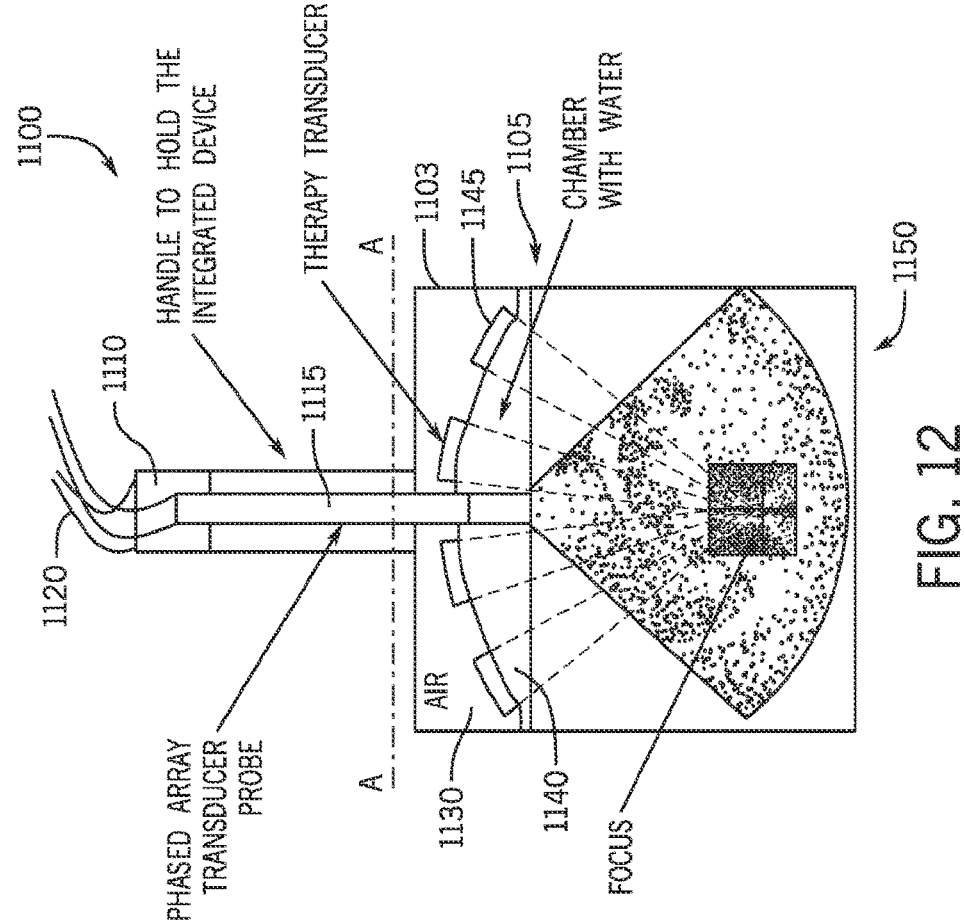
FIG. 12 shows a side view of a FUS applicator and an illustration of a corresponding focus, according to an exemplary embodiment.

FIG. 12 shows a schematic of a side-cross-sectional view of a VF-FUS device 1100 and corresponding treatment region, according to an exemplary embodiment. Device 1100 is powered by wires 1120, which are coupled to handle 1110. Handle 1110 is coupled to main body 1103. An imaging transducer 1115 is coupled to main body 1103 to enable spatially-registered image guidance. Main body 1103 houses therapy transducers 1145, air-filled chamber 1130, and water-filled chamber 1140. Therapy transducers 1145 treat a region 1150. Therapy transducers 1145 are configured such that focus of each associated imaging plane intersects with the treatment region 1150. Various implementations of device 1100 may enable treatment of different lateral cross-sections ranging from 4 mm to 10 mm, different longitudinal cross-sections ranging from 5 mm to 40 mm, and at different depths of focus ranging from 3 cm to 10 cm.

Figure 13:
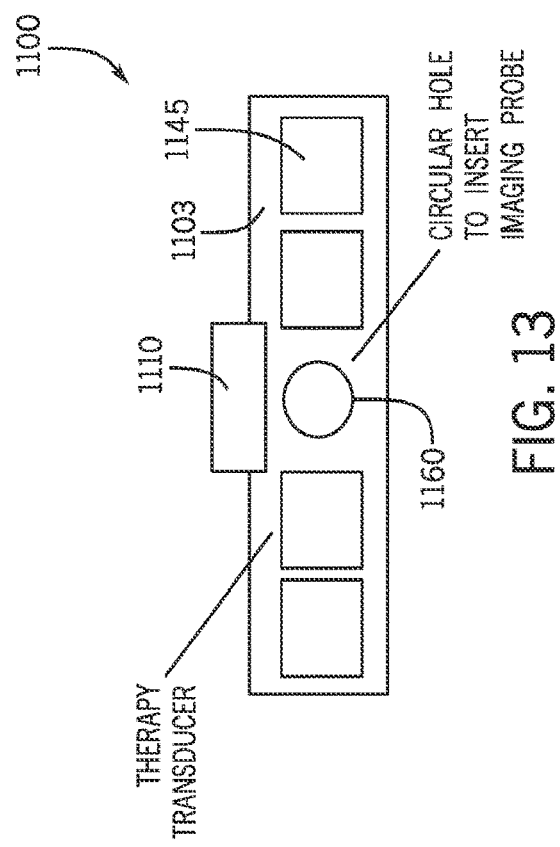
FIG. 13 shows a top cross-sectional view of the FUS applicator shown in FIG. 12, according to an exemplary embodiment.

FIG. 13 shows a top cross-sectional view of device 1100, according to exemplary embodiments. FIG. 13 illustrates the configuration of therapy transducers 1145 within main body 1103 about a substantially central hole 1160. Hole 1160 is configured to interface with imaging transducer 1115. Device 1100 is configured to enable simultaneous ultrasonic imaging and therapy administration.

FIG. 14 shows a side view of a device 1100, according to an exemplary embodiment. FIG. 14 shows a configuration of handle 1110 coupled to main body 1103, and components housed therein. FIG. 15 shows a top cross-sectional view of device 1100, which therapy transducers 1145 configured in pairs about mirroring sides of an integrated small linear array 1170. Array 1170 is configured to guide the placement of device 1100 to accurately target the treatment region 1150. In various embodiments, array 1170 is configured to be substantially central within main body 1103. In various embodiments, array 1170 includes a conventional ultrasonic imaging array and the therapy transducers 1145 include a plurality of air backed cylindrical sectored PZT crystals for therapy. In various embodiments, the number of air backed cylindrical sectored PZT crystals may range from 2-12. Use of air backed therapy transduces is intended to maximize acoustic power delivery to the receiving tissue. Water will be circulated (via chamber 1140) through the main body 1103 to cool the therapy transducers 1145 and also cool the interface between device 1100 and the treatment surface to avoid burns. In various embodiments, transducer 1115 is configured to operate with B-mode imaging. In various other embodiments, imaging transducer 1115 can also be used for unprocessed RF beam-former imaging or Doppler imaging in addition to B-mode imaging.

In various embodiments, device 1100 may be communicatively coupled to a software that is controllable via a user interface to monitor and control imaging and VF-FUS treatment delivery. In some embodiments, the focal zone of the therapy transducer (e.g., region 1150) will be marked/overlaid on a B-mode image for a user to accurately place the treatment device (e.g., device 1100) and treat a target region (e.g., region 1150).

Various embodiments of device 1100 may be used externally in a hand-held configuration or mounted on a flexible 'gooseneck' that can be locked into position. Various embodiments of device 1100 may include an equine and/or companion pet animal application-specific adaptation.

Using highly directive, high-intensity propagating ultrasound energy emitted from a soft-focused transducer array, the embodiments of external device 1100 may enable spatially controlled therapy while actively minimizing dose to surrounding non-targeted regions (e.g. regions outside region 1150) in patients. In various embodiments, region 1150 may be located at depths ranging from 0.5 to 5 cm from the skin. In various embodiments, device 1100 may enable determination and/or control of dimensions (e.g. length, width, area) and/or focal depth corresponding to treatment region 1150.

In various embodiments, imaging transducer 1115 may have a bandwidth of 50-50% around a 6 dB threshold, with an imaging depth of 8 cm and axial resolution of 0.5 mm or better. In various embodiments, the therapy transducer 1145 efficiency is 50% or greater. In various implementations, the imaging transducer 1115 is fully integrated within the VF-FUS device 1103 housing such that therapy transducers 1145 and imaging transducer 1115 are precisely spatially co-registered automatically.

FIG. 16A shows a perspective view of a VF-FUS device 1100, according to exemplary embodiments. FIGS. 16B-C show a top view of the VF-FUS device 1100. As shown, device 1100 has a handle 1110, which is coupled to main body 1103. In addition, therapy transducers 1145 are disposed within main 1103. Substantially central within main 1103 is an opening 1175, which enables the placement of an imaging transducer (e.g., imaging transducer 1115) and/or integrated small linear array (e.g., array 1170).

FIG. 17 shows a perspective view of the VF-FUS device 1100 coupled to an imaging transducer ("probe") 1115, according to an exemplary embodiment. As shown, therapy transducers 1145 are configured about imaging transducer 1115, which is configured to be substantially central within main body 1103. Device 1100 is configured to provide VF-FUS treatment via an interface between surface 1105 and the skin of a patient.

Figure 19:
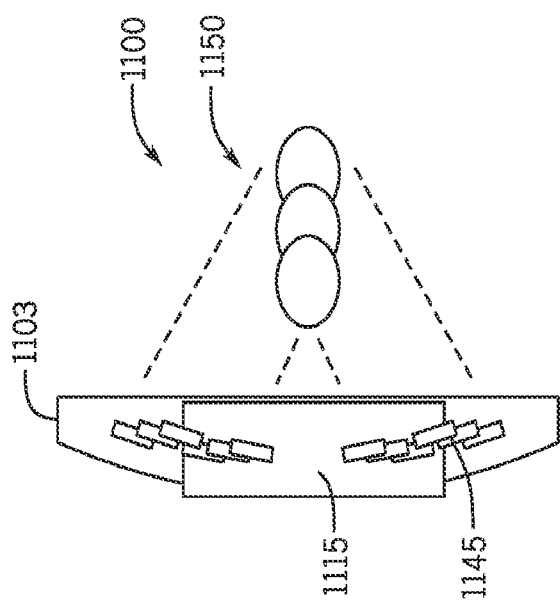
FIG. 19 shows a side view of the FUS applicator of FIG. 18, according to an exemplary embodiment.
Figure 18:
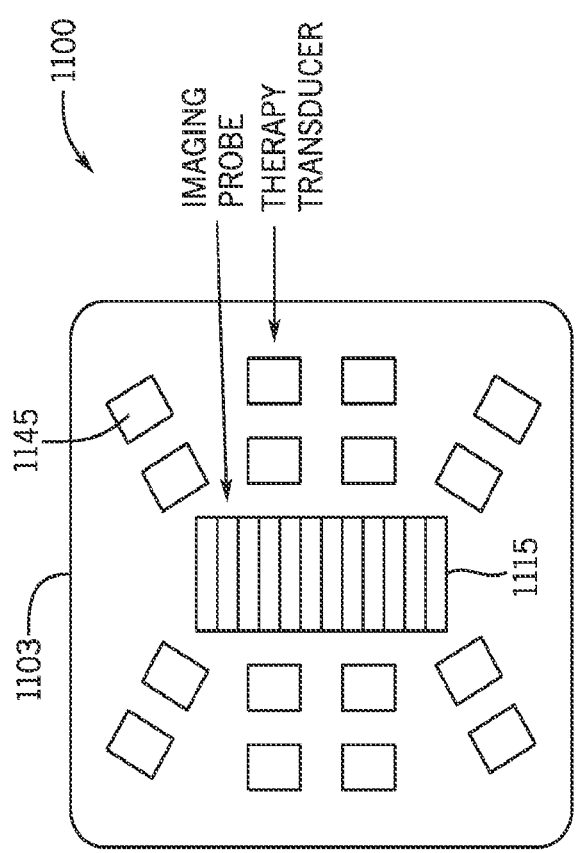
FIG. 18 shows a top view of a FUS applicator, according to another exemplary embodiment.
Figure 20:
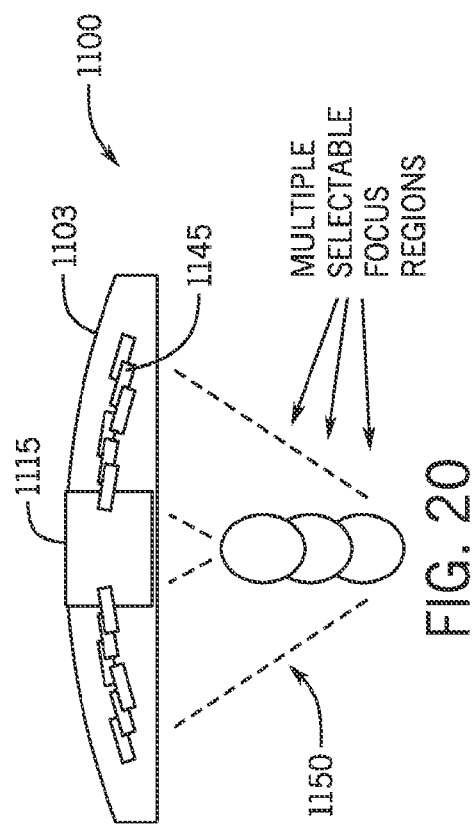
FIG. 20 shows a side view of the FUS applicator of FIG. 18, according to an exemplary embodiment.

Various embodiments of the VF-FUS device 1100 may enable larger and deeper volume treatment. FIGS. 18-20 show alternate views of a device 1100 with a substantially radial therapy transducer configuration, according to an exemplary embodiment. FIG. 18 shows a top view of device 1100 near main body 1103, which contains an imaging transducer 1115. Imaging transducer 1115 is configured such that it is substantially central within main body 1103. Therapy transducers 1145 are configured to be positioned radially relative to transducer 1115. In various embodiments, therapy transducers 1145 are in a mirrored configuration about transducer 1115. In various other embodiments, therapy transducers 1145 are not mirrored about transducer 1115.

FIGS. 19-20 show side views of device 1100 near the main body 1103, according to exemplary embodiments. As shown, therapy transducers 1145 are configured to be positioned within main body 1103 at a pitch angle relative to a treatment surface 1105. In various embodiments, therapy transducers 1145 may be configured to each have the same pitch angle, different pitch angles, or a combination thereof.

The pitch angles of each therapy transducer 1145 determines the focal regions 1150 of the device 1100.

Figure 21:
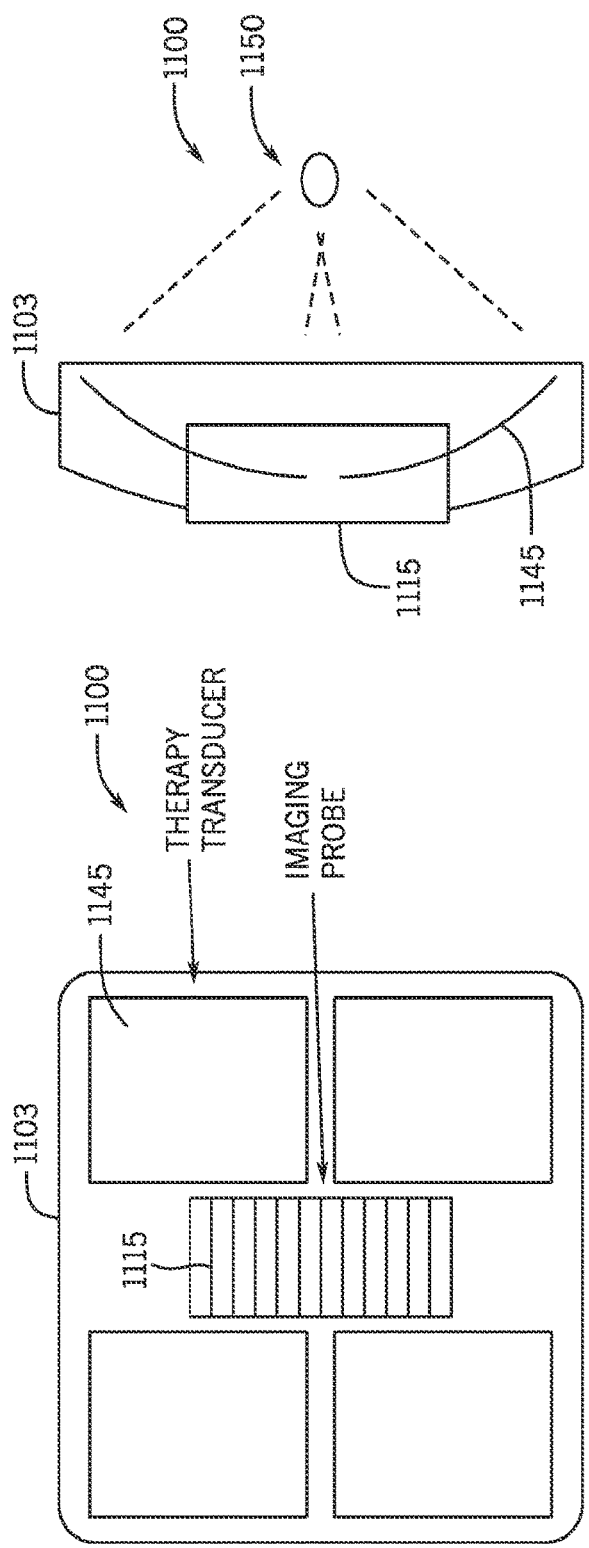
FIG. 21 shows a top view of a FUS applicator, according to another exemplary embodiment.
Figure 22:
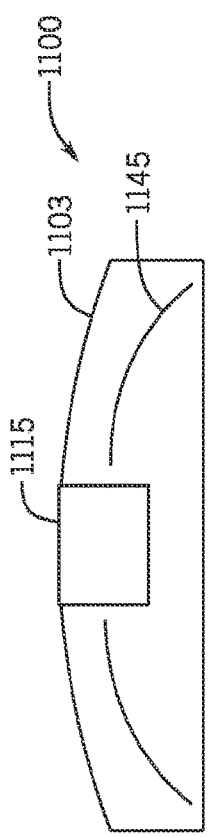
FIG. 22 shows a side view of the FUS applicator of FIG. 21, according to an exemplary embodiment.
Figure 23:
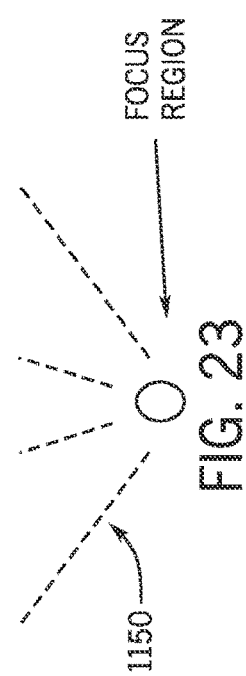
FIG. 23 shows a side view of the FUS applicator of FIG. 21, according to an exemplary embodiment.

FIGS. 21-23 show alternate view of a device 1100 with a dual paired therapy transducer configuration, according to an exemplary embodiment. FIG. 21 shows a top view of device 1100 near main body 1103, which contains an image transducer 1115. Imaging transducer 1115 is configured such that it is substantially central within main body 1103. Therapy transducers 1145 are configured to be positioned on two mirroring sides of transducer 1115. FIG. 21 shows 4 therapy transducers 1145, arranged in two pairs. In various embodiments, device 1100 may contain any number of paired therapy transducers 1145.

FIGS. 22-23 show side views of device 1100 near the main body 1103, according to exemplary embodiments. As shown therapy transducers 1145 are configured to have substantially similar pitch angles on opposite sides of a centrally located imaging transducer 1115. Therapy transducers 1145 are configured within main body 1103 to direct treatment within a region 1150 located a distance below treatment surface 1105.

Figure 25:
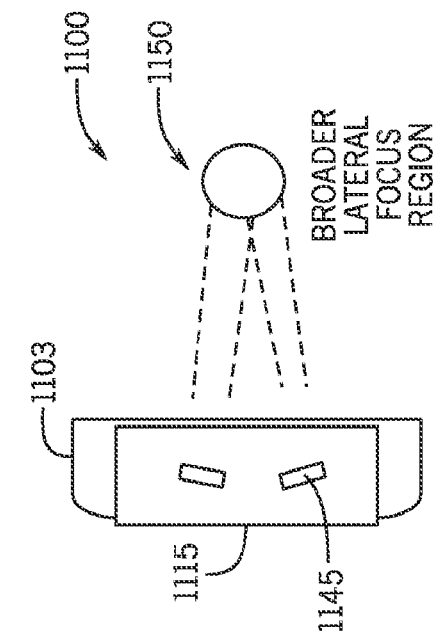
FIG. 25 shows a side view of the FUS applicator of FIG. 24, according to an exemplary embodiment.
Figure 24:
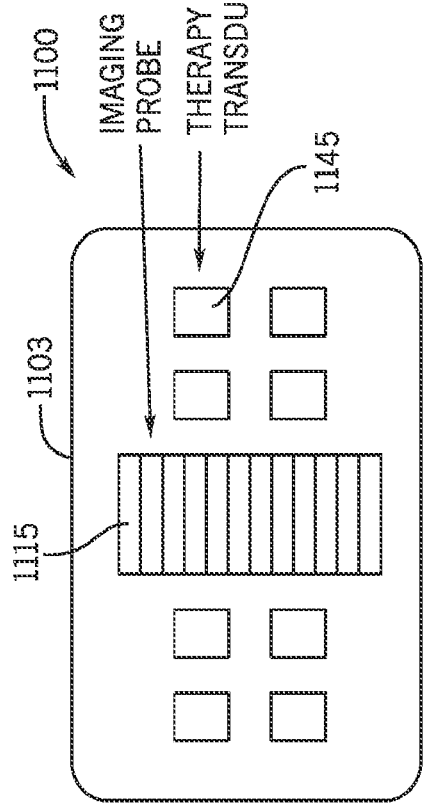
FIG. 24 shows a top view of a FUS applicator, according to another exemplary embodiment.
Figure 26:
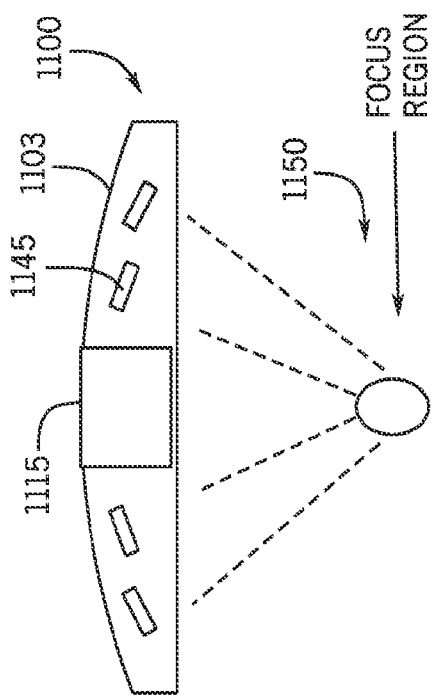
FIG. 26 shows a side view of the FUS applicator of FIG. 24, according to an exemplary embodiment.

FIGS. 24-26 show alternate view of a device 1100 with a multi-paired therapy transducer configuration, according to an exemplary embodiment. FIG. 24 shows a top view of device 1100 near main body 1103, which contains an image transducer 1115. Imaging transducer 1115 is configured such that it is substantially central within main body 1103. Therapy transducers 1145 are configured in pairs and are positioned on two mirroring sides of transducer 1115. FIG. 24 shows 8 therapy transducers 1145, arranged in 4 pairs (with 2 pairs on each side of transducer 1115). In various embodiments, device 1100 may contain any number of paired therapy transducers 1145.

FIGS. 25-26 show side views of device 1100 near the main body 1103, according to exemplary embodiments. Therapy transducers 1145 may be configured to have substantially similar pitch angles on opposite sides of a centrally located imaging transducer 1115. In alternate embodiments, therapy transducers 1145 may have different pitch angles. Therapy transducers 1145 are configured within main body 1103 to direct treatment within a region 1150 located a distance below treatment surface 1105.

Figure 27A:
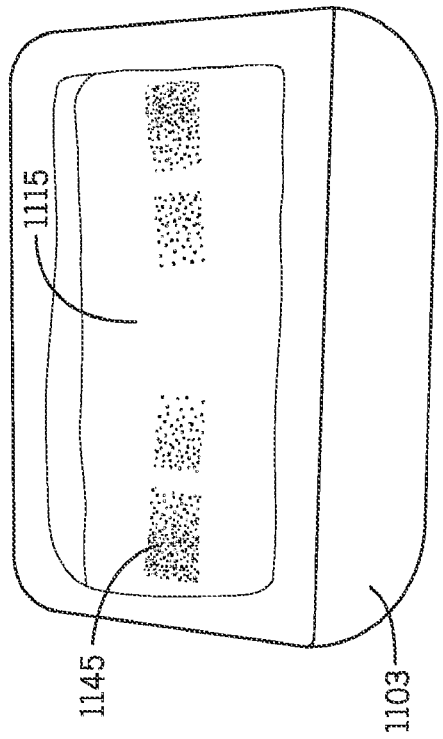
FIGS. 27A-27B show a top view of a FUS applicator, according to another exemplary embodiment.
Figure 27B:
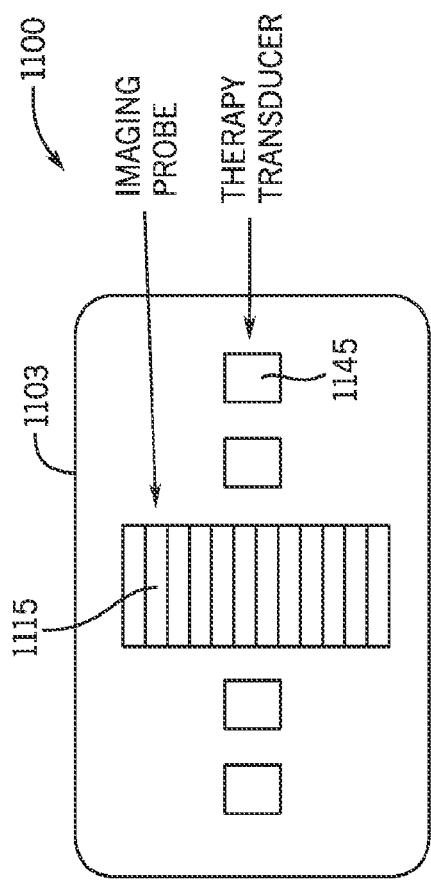
Figure 28:
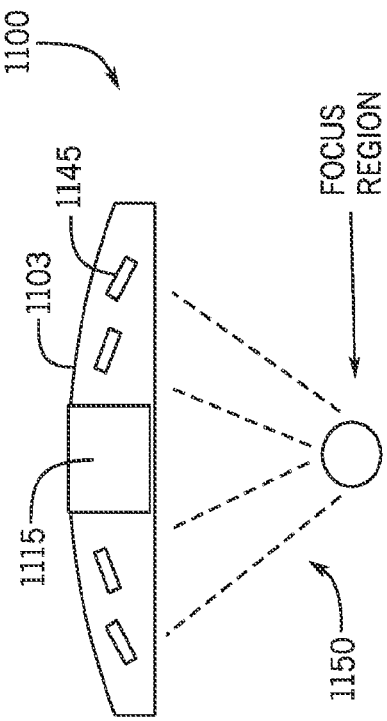
FIG. 28 shows a side view of the FUS applicator of FIG. 27, according to an exemplary embodiment.
Figure 29:
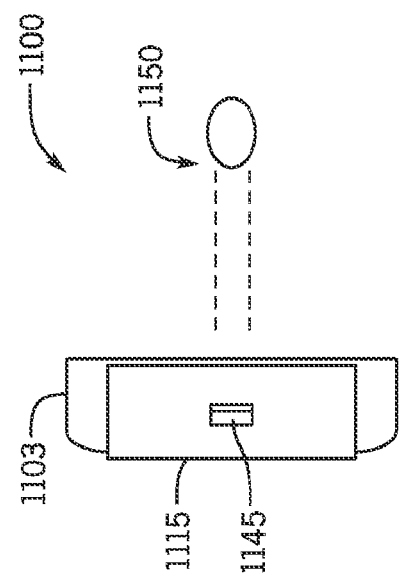
FIG. 29 shows a side view of the FUS applicator of FIG. 27, according to an exemplary embodiment.

FIGS. 27-29 show alternate view of a device 1100 with a linear therapy transducer configuration, according to an exemplary embodiment. FIGS. 27A-B shows a top view of device 1100 near main body 1103, which contains an imaging transducer 1115. Imaging transducer 1115 is configured such that it is substantially central within main body 1103. Therapy transducers 1145 are configured to be positioned on two mirroring sides of transducer 1115, wherein therapy transducers 1145 are aligned in a single plane within main body 1103. FIGS. 27A-B show 4 therapy transducers 1145, arranged in two therapy transducers 1145 on opposite sides of imaging transducer 1115. In various embodiments, device 1100 may contain any number of collinear therapy transducers 1145.

FIGS. 28-29 show side views of device 1100 near the main body 1103, according to exemplary embodiments. As shown therapy transducers 1145 are configured to have substantially similar pitch angles on opposite sides of a centrally located imaging transducer 1115. Therapy transducers 1145 are configured within main body 1103 to direct treatment within a region 1150 located a distance below treatment surface 1105.

As described, various embodiments of device 1100 may include an integral ultrasound imaging array as illustrated in FIGS. 10-29. To account for size of human anatomy, various embodiments of device 1100 may include an imaging array that is configured to operate with a focal image depth of 8 cm, and with electronic focal zones from 3-10 cm. Various embodiments of device 1100 may include a custom ultrasound imaging array or a pencil beam imaging transducer. Therapy transducers 1145 include 2-12 air-backed cylindrical sectored and curve-mounted piezoelectric transducers that are mounted onto the curved housing of 1103, which may be used to deliver pulsed or continuous focused ultrasound energy into a target region. In various embodiments, the imaging array transducer probe is a phased array, whereas a single scanned focused imaging transducer probe is not a phased array, but rather a scanning probe for imaging. In embodiments wherein therapy ultrasound transducers (e.g., transducers 1145) within device 1100 are not phased, the transducers 1145 are instead multiple individually focused transducers within a main body 1103 of device 1100. Each of the transducers 1145 is of greater dimensions than the acoustic wavelength at the operating frequency of the individual transducer. In various embodiments, therapy transducers 1145 may be coupled to a support structure within main body 1103, which is configured to overlay individual foci within a treatment region. Main body 1103 may be a curved surface on which the individual multiple therapy transducers 1145 is mounted. A curved surface enables the ability to focus treatment on a specific region, while individual therapy transducers can also be curved (in an example embodiment, they may include a smaller curvature than that of the main body 1103) to focus at sub-regions within the larger region determined by the housing curvature. The ability to vary the pitch angle as described above also enhances this sub-region focusing capability.

In various embodiments, the sizes of the therapy transducers implemented within device 1100 do not permit phase-focusing as is typically done with diagnostic imaging. Further, each transducer may be powered asychronically. Because imaging and therapy application are combined operations within device 1100 and may be rigidly mechanically coupled, the imaging and therapy focal regions will spatially registered synchronously and can thus be used to enable accurate placement for treatment to a specific region. In various implementations, a physician-friendly software user interface may be used in conjunction with VF-FUS device 1100 to aid in imaging and treatment delivery. In various embodiments, a pulsed-echo technique and B-mode images may be utilized to accurately overlay the focal zone of therapy transducers and imaging in device 1100. This will allow for real time monitoring of the VF-FUS treatment administered by device 1100.

As described, various embodiments of VF-FUS device 1100 may enable simultaneous imaging and treatment administration. Such an integrated device 1100 may also include a conventional ultrasound imaging array and 4-pair air backed cylindrical sectored PZT crystals for therapy. As described, the therapy transducers (e.g. transducers 1145) within device 1100 are configured such that the focus of the imaging plane intersects with the treatment region (e.g., region 1150). The therapy transducers are air backed to maximize acoustic power delivery to the tissue—a high Q-system. As described, various embodiments include water circulation throughout device 1100 to cool therapy transducers 1145 and also cool the skin interface to avoid burns on the skin surface. In various embodiments, the imaging transducer 1115 is placed within main body 1103 such that the B-mode image plane intersects the treatment zone.

Figure 30:
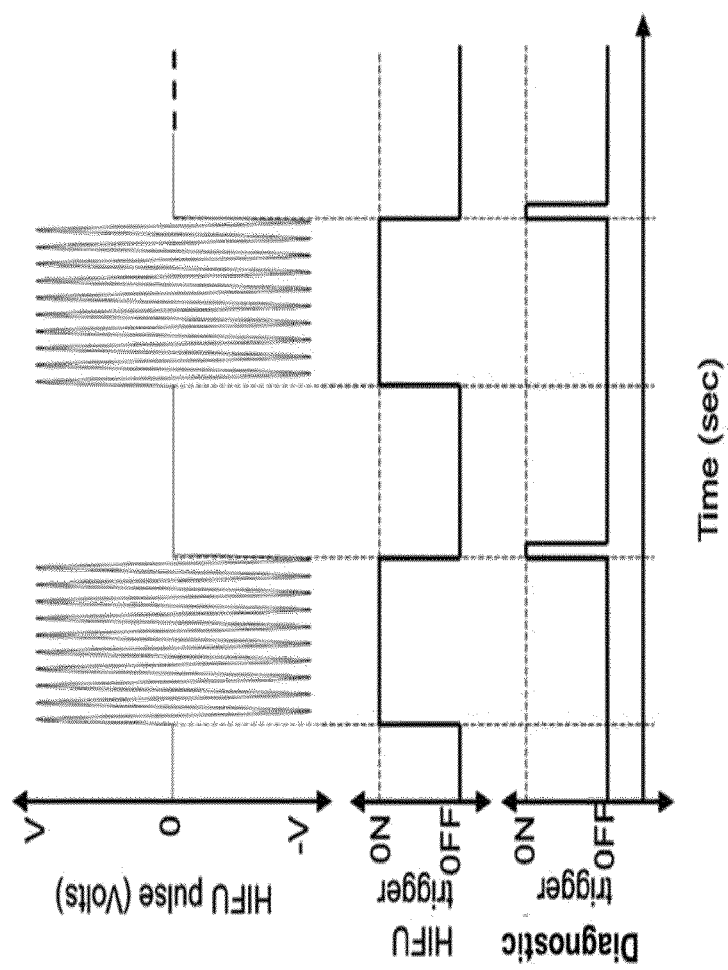
FIG. 30 shows synchronization of diagnostic image acquisition and volume-focused ultrasound (VF-FUS) therapy triggering pulses.

The imaging array system (e.g., transducer 1115) within device 1100 may also be used to monitor the therapy by observing changes in a speckle pattern of the target region (e.g., region 1150) in the B-mode images, and through quantitative ultrasound (QUS) imaging parameters. FIG. 30 shows various implementations wherein imaging and therapy pulses may be synchronized to avoid cross-talk. Synchronizing off-on periods between therapy and image acquisition during therapy enables both continuous target tracking and the ability to use the imaging for monitoring the therapy induced changes to the target tissue.

In various implementations, sector scanning may be employed to cover a wider treatment region of interest. In other implementations, the VF-FUS device 1100 may be coupled with a COMSOL Multiphysics or similar multiphysics and/or finite element modeling system to enable the consideration of appropriate tissue properties, including perfusion effects. Such operations may use perfusion to account for blood flow in the tissue vessels for dynamic perfusion modeling in-silico, and anatomically accurate phantoms used to optimize VF-FUS dose parameters.

As described, ultrasound image-guidance may be implemented for placement of a VF-FUS device (e.g., 1100) and targeting a planned treatment region. This may be accomplished under 3-dimensional (3D) electromagnetic (EM) tracked image guidance. In various implementations, a VF-FUS device may be integrated with an ultrasound imaging system that can be used to track device placement in real time.

Figure 31:
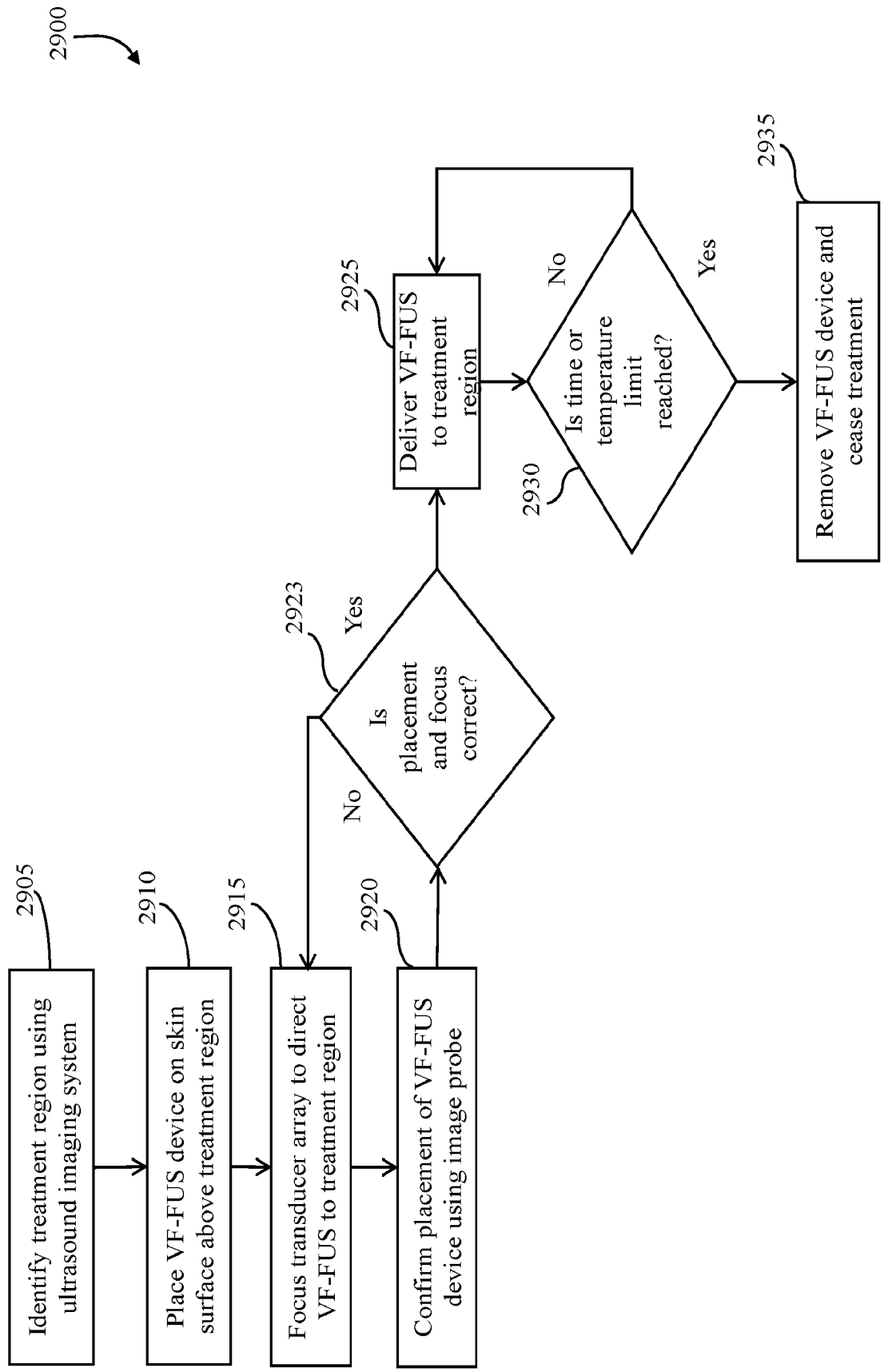
FIG. 31 shows a flow diagram of a method for applying liFUS using a VF-FUS device, according to an exemplary embodiment.

FIG. 31 shows a flow diagram illustrating a method 2900, wherein an ultrasound imaging system may be used to identify a region for treatment, such as region 1150, (e.g., location of nerve disorder) in operation 2905. After the treatment region 1150 is identified in operation 2905, a VF-FUS device (e.g., device 1100) may be placed directly on a skin surface above the treatment region 1150 in operation 2910. In operation 2915, a transducer array (comprising a plurality of therapy transducers 1145) within device 1100 may be focused to direct liFUS on the treatment region 1150. An imaging transducer 1115 (or "probe") may be used in operation 2920 to confirm appropriate placement of device 1100 and focus of therapy transducers 1145. Placement of device 1100 and focus of the therapy transducers 1145 may be verified in operation 2923. liFUS may be subsequently delivered in operation 2925 to the treatment region 1150 for a predetermined time limit or until a maximum temperature limit is reached. Once either the time and/or temperature limit is reached in operation 2930, the VF-FUS device 1100 may be removed in operation 2935 to cease treatment of region 1100. In various embodiments, the location (e.g., depth) of treatment region 1150 and associated transducer array (comprised of therapy transducers 1145) configuration may be determined based on a size, weight, genetic marker or makeup, age, disorder type, and/or disorder location associated with the treatment recipient or patient.

Figure 32:
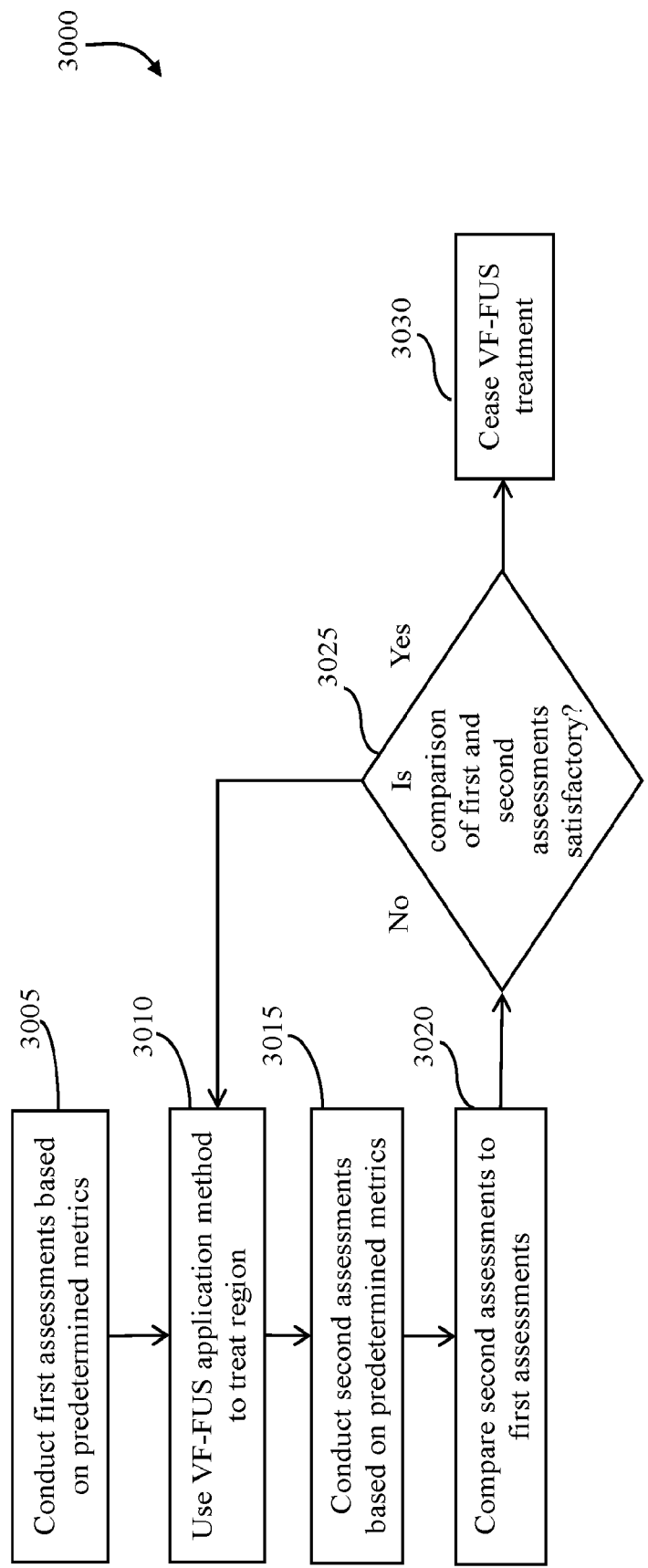
FIG. 32 shows a flow diagram of a process for implementing a method using a VF-FUS device, according to an exemplary embodiment.

In another implementation, method 2900 may be employed iteratively through process 3000 is depicted in a flow diagram shown in FIG. 32. In process 3000, a first set of assessments of one or more predetermined metrics may be made relating to a prospective treatment recipient or patient in operation 3005. In various embodiments, the metrics may include, but are not limited to, a sensory rating, a pain level, a nerve conduction velocity, skin shrinkage, cell or tissue necrosis, tumor volume assessment, mechanical thresholds (e.g., Von Frey filament), or a behavioral response (e.g., withdrawal, guarding, kicking, vocalization, etc.). After the first assessment in operation 3005, method 2900 may be employed to administer treatment in operation 3010.

After treatment administration in operation 3010, a second set of assessments of the one or more predetermined metrics may be made in operation 3015. In operation 3020, the second set of assessments are compared to the first set of assessments. In operation 3025, if the second set of assessments are appreciably improved compared to the first set of assessments, then the process 3000 may terminate and the treatment may cease in operation 3030. If the second set of assessments are not appreciably improved compared to the first set of assessments, or are substantially similar to the first set of assessments, operations 3010, 3015, 3020, and 3025 may be repeated.

Method 2900 and process 3000 related to the use and function of the herein disclosed VF-FUS device have been tested and validated through in-vivo studies. In the in-vivo studies, it was determined that depths of 4 cm in 7 week old animals and 4.5 cm in 8 week old animals were needed to visualize the dorsal root ganglia (DRG). The focusing properties of a therapy transducer and an external diagnostic imaging array were used to focus 4-5 cm deep into receiving tissue. An ultrasound imaging system was used for guidance and placement of the VF-FUS device superficially to target the DRG at L4-L5 region. The treatment probe was designed with a window for placement of an imaging probe aligned with the therapy focal region. A 10 MHz diagnostic ultrasound linear imaging array was used for image guidance. The L5 transverse process was first located, followed by the DRG region. Using image guidance, the VF-FUS device was placed such that the focal region of the therapy transducers (e.g., transducers 1145) aligned with the targeted region.

Figure 33:
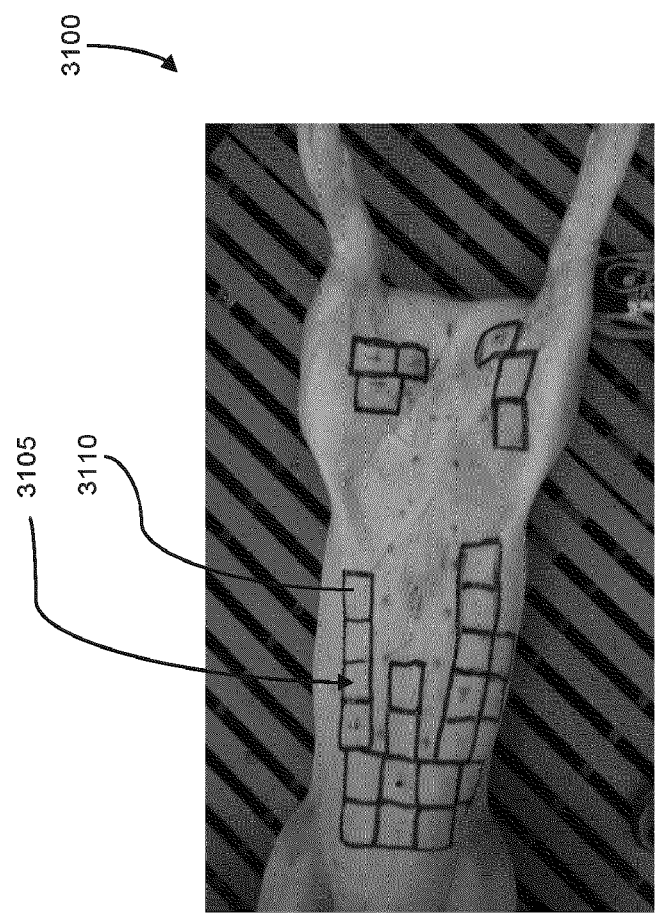
FIG. 33 shows ultrasound treatment areas as marked on a prepared skin surface from an in-vivo experiment using dual beam applicators.

Ultrasound imaging has been extensively used to monitor VF-FUS. FIG. 33 shows a grid 3105 of treatment regions 3110 identified on a prepared skin surface 3100 from an in-vivo study using a dual beam VF-FUS device. In the experiment, ultrasound image-guidance was combined with 3D EM tracked imaging to precisely place a thermocouple at the focal zone of a VF-FUS device to verify accurate treatment region targeting. 6-DOF 3D EM tracking was used for both the sensor and the imaging to exactly determine sensor location to within +/−0.75 mm. Specifically, a 6 DOF EM sensor with 1.5 mm accuracy was attached to a fine needle thermocouple and inserted into the prepared tissue. Tracking was done in 3D with respect to the resultant ultrasound image, which enabled determination of the precise location of the sensor throughout the experiment. EM tracking enables placement of the thermocouples precisely at the target location in-vivo. Using the in-vivo results, a look-up table was defined for power settings and exposure time to the respective rise in temperature.

Specifically, the equation: $P=P_0*\exp(-2*\text{attenuation coefficient}*\text{tissue depth})$ was employed, where P is the estimated power that reaches the target and $P_0$ is the input power. The attenuation coefficient of muscle was 0.6-0.7 dB/MHz/cm. Results were very encouraging in showing linear changes in quantitative ultrasound (QUS) parameter with corresponding changes in temperature in the tissue. The QUS parameters were compared with the ground truth measurement of the temperature measured by the needle thermocouple placed near the treatment site.

Figure 35:
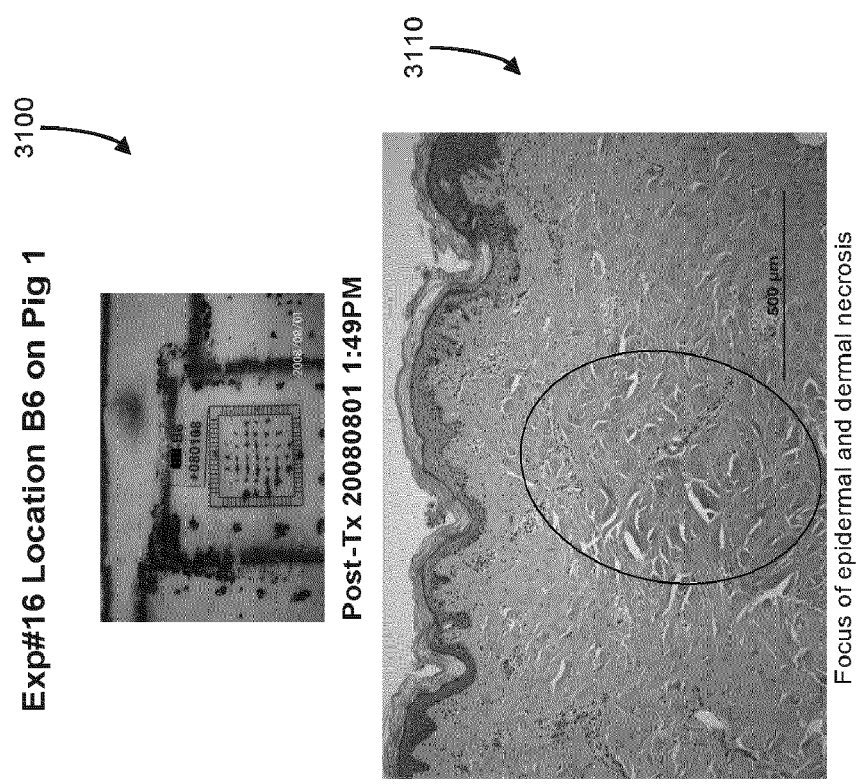
FIG. 35 shows a skin area from FIG. 35 that shows epidermal and dermal necrosis from an in-vivo experiment using dual beam applicators.
Figure 34:
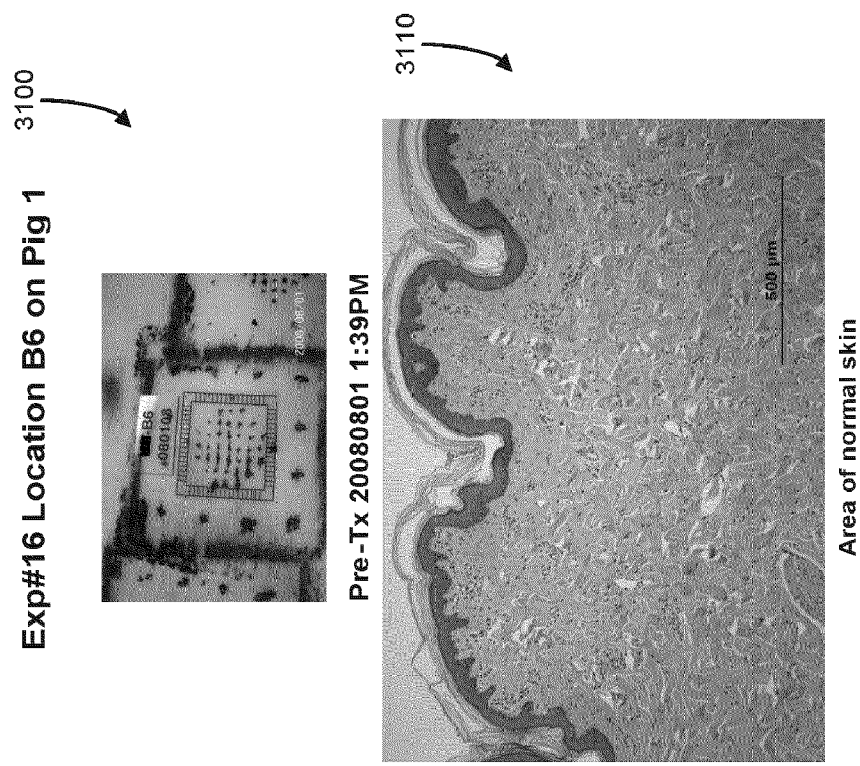
FIG. 34 shows a skin area from FIG. 35 that corresponds to normal skin from an in-vivo experiment using dual beam applicators.

FIGS. 34-35 show in-vivo experiment results using a dual beam VF-FUS device (e.g., 1100). FIG. 34 shows histology from an area of normal skin corresponding to a region from regions 3110 from grid 3105 on surface 3100 in FIG. 33. FIG. 35 shows the histological results from an area of skin showing epidermal and dermal necrosis, wherein the area corresponds to region from regions 3110 on surface 3100 after treatment with VF-FUS. FIG. 36 shows a view of the in-vivo experiment from FIG. 35, illustrating placement of the device 1100 and a collocated thermocouple (or thermal sensor) relative to the surface 3100.

Figure 37:
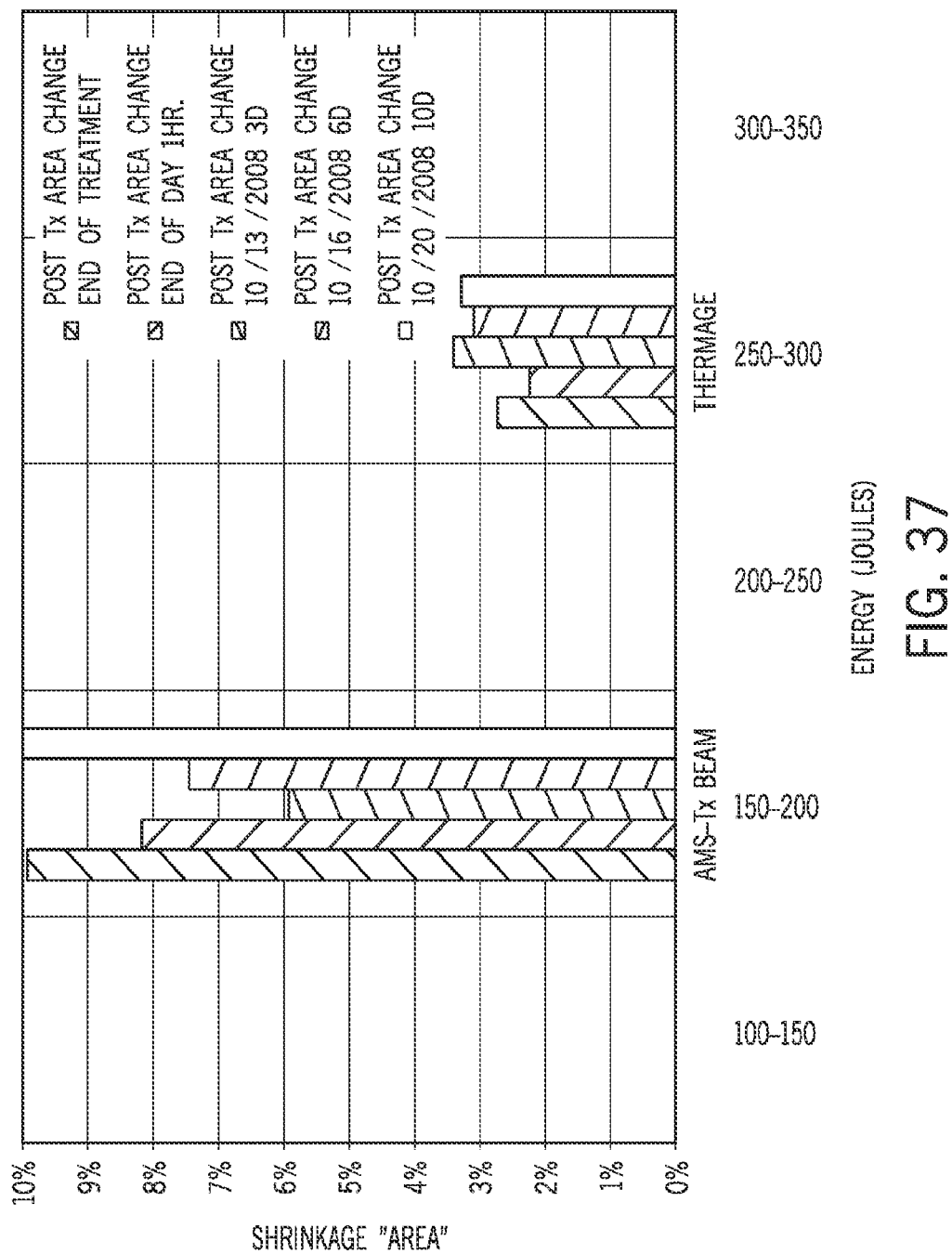
FIG. 37 shows skin shrinkage area vs. energy from an in-vivo experiment using dual beam applicators.

FIGS. 36-37 show in-vivo study results after VF-FUS treatment, wherein skin shrinkage within the treatment area is compared to supplied energy (in Joules). FIG. 36 shows shrinkage vs. energy for various energy-administering devices. FIG. 37 shows shrinkage vs. energy over periods of time, demonstrating durability of response for the ultrasound therapy.

Figure 38:
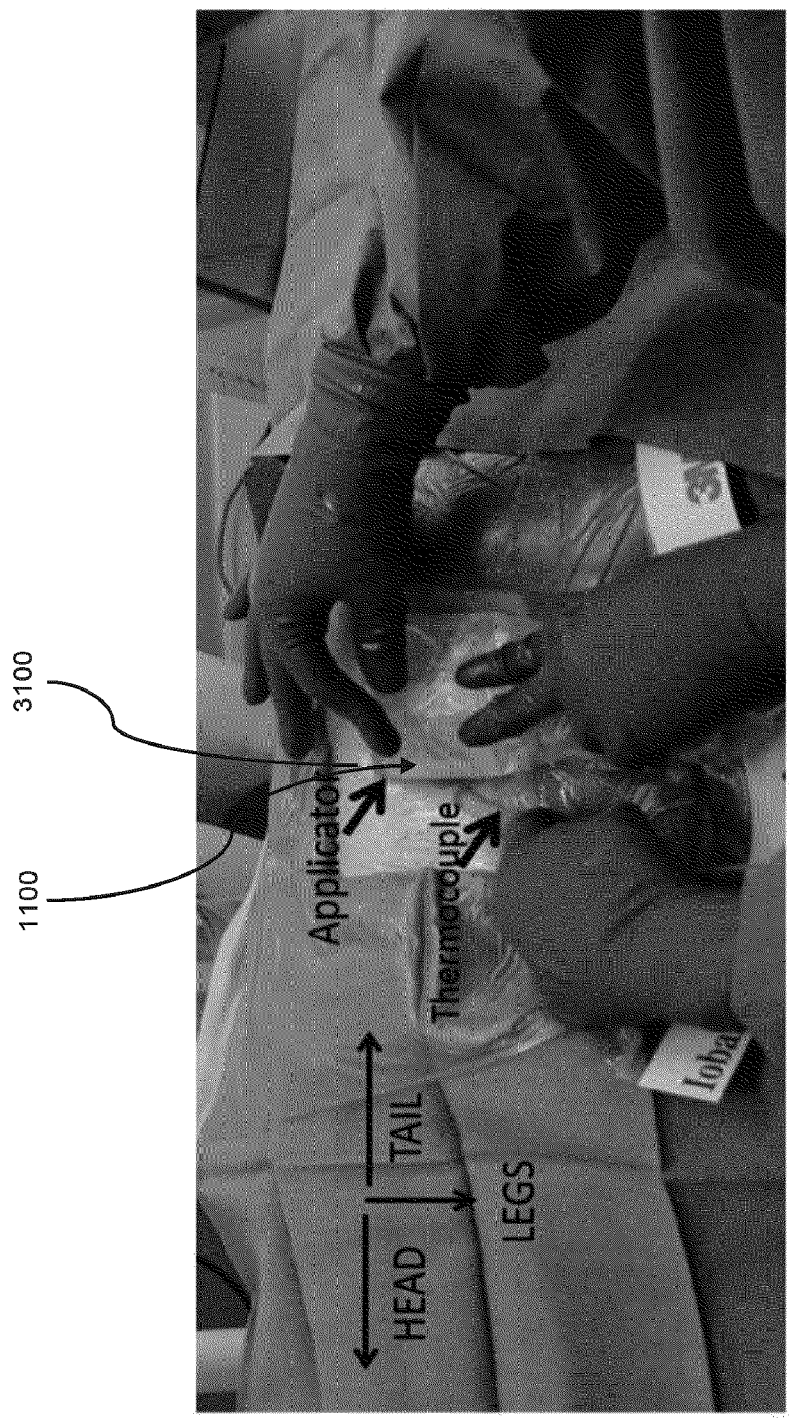
FIG. 38 shows a position of the externally-coupled focused ultrasound treatment applicator and a thermocouple inserted to the depth of the focal zone during VF-FUS treatment of DRG during an in-vivo experiment.
Figure 39B:
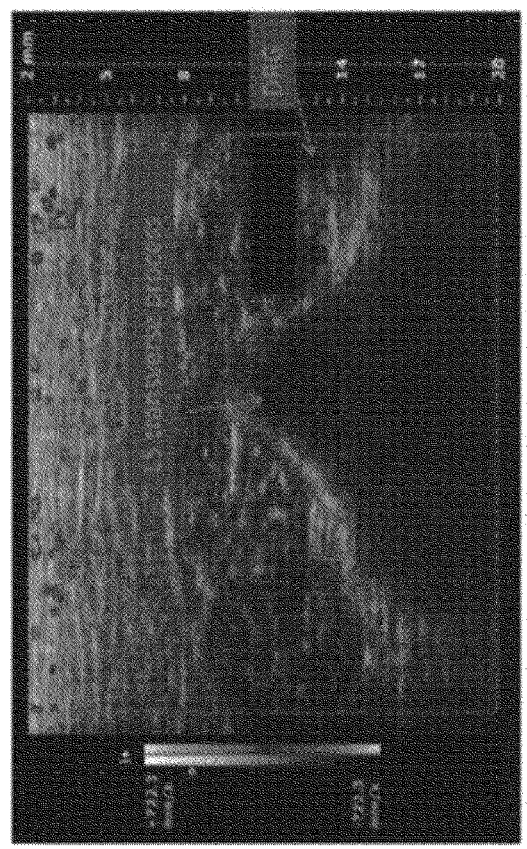
FIG. 39A-39B show an ultrasound image of the implanted thermocouple inserted to the depth of the focal zone of the treatment and alternate views of the L5 dorsal root ganglion (DRG) and L5 transverse process using ultrasound guidance.
Figure 39A:
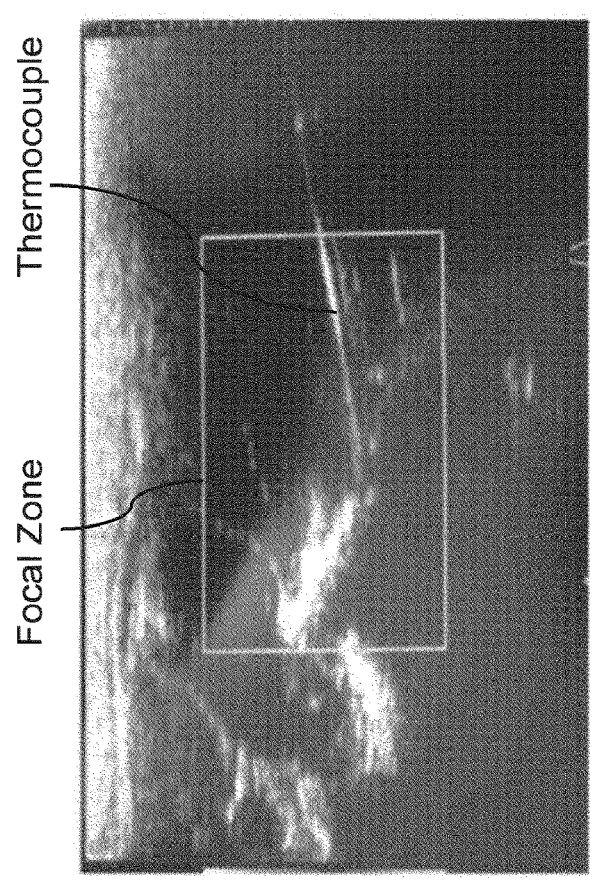

A swine model for peripheral neuropathy was created by ligation of a distal nerve producing pain which was measurable. The DRG for that nerve was treated using liFUS treatment delivered noninvasively under general anesthesia (see FIG. 38.), with needle temperature sensors for 'ground truth' thermal measurement. FIG. 38 shows a view of the in-vivo experiment, illustrating placement of the device 1100 and a collocated thermocouple (or thermal sensor) relative to the surface 3100. FIG. 39A shows the focal zone of the VF-FUS device and an image of the thermocouple placement. FIG. 39B shows an ultrasound image of the spinal transverse process and the adjacent DRG location.

Various embodiments of a VF-FUS device may be integrated with 3D tracking and include EM sensors located at an end of the aforementioned integrated device. Other devices such as needle thermocouples (which are registered real-time with a reference sensor) that are typically placed on the body of a subject may also be coupled. Resulting 2-dimensional (2D) orthogonal image views combined with a 3D view of an example stylus may be used to guide the insertion of a catheter. Various implementations with integrated device 1100 may include tracking sensors integrated within a dual purpose drug delivery and/or ultrasound therapy steerable catheter for controlled 3D tracking and dose overlays.

Various implementations of the integrated VF-FUS device (e.g., device 1100) may employ a pulse-echo technique in addition to acquisition of B-mode images using the imaging array (e.g., transducer 1115) housed within the device. Implementations including noninvasive ultrasound monitoring through quantitative processing of RF images prior to image formation have potential to increase sensitivity through increased sampling and comparison of relative ultrasound parameter changes (e.g., velocity, attenuation, k parameter, changes in speckle pattern, etc.) to direct ground truth minimally invasive sensor measurements. As described, integrated imaging may be used to guide placement of the integrated device and accurately target a treatment region.

In various implementations, an ergonomic software user interface may be coupled with the integrated VF-FUS device (e.g., device 1100) to further enable imaging, region targeting, and treatment delivery. Specifically, B-mode images of the focal zone of the therapy transducers (e.g., 1145) may be marked in conjunction with 3D EM with 6 degrees of freedom (6-DOF) tracking for a user to accurately place integrated device 1100 and treat a target region (e.g., region 1150). In various implementations, a focal region associated with the therapy transducer set (e.g., transducers 1145) may be indicated with colored or highlighted region overlaid on a produced ultrasound image. As described, the imaging transducer 1115 and the therapy transducers 1145 within device 1100 are co-registered, so this overlaid region can be used to identify an appropriate treatment region. A clinician, or user of the integrated VF-FUS device 1100 may place the device such that the focal region aligns with the target region as identified from the underlying B-mode image. In various implementations, software may be coupled with the integrated device 1100 to provide a user interface to a user of the integrated device 1100.

Ultrasound imaging has been extensively used to monitor liFUS. As described, a thermal sensor may be incorporated on the acoustic coupling membrane (e.g., interface 1105) for temperature feedback of skin coupling and safety. In various implementations, VF-FUS therapy transducers (e.g., transducers 1145) contained within various embodiments of the herein disclosed VF-FUS device (e.g., device 1100) may produce:

1) >50% electro-acoustic efficiency
2) handling of input powers up to 40 W without degradation of the ultrasound crystals
3) collimated ultrasound energy corresponding to a length of the transducer, with no energy extending beyond the element ends
4) output in a lateral direction per design, which may be focused or unfocused.
5) good resonant quality as evidenced by Q-factor and qualitative shape Various implementations of an integrated imaging array can acquire unprocessed RF signals at low power in a "receive mode" for quantitative measurements, using cross-correlation methods to assess optimal combinations of various parameters (e.g., attenuation, ESD, EAC, k parameter). This may enable maximization of the sensitivity of the noninvasive image-based monitoring methods and enable correlation with ground truth thermocouple measurements. This may further facilitate the determination of an absolute temperature with which to correlate relative changes (e.g., over time) in the processed image data, optimized for sensitivity. In various implementations, the imaging array may operate at 7-13 MHz.

In various implementations, therapeutic pulses of 10-100 Hz may be programmable via the VF-FUS device and any coupled systems to produce pulsed FUS. The diagnostic and the therapy pulses may be synchronized to avoid interference between operational modes as shown in FIG. 30. In various implementations, the diagnostic imaging may be displayed to the user every 10-15 seconds, thereby enabling validation of therapy and providing feedback for VF-FUS device re-positioning if needed. Pulsed FUS can be used for therapy of nerve dorsal root ganglia (DRG) or for therapy of superficial nerves, such as the occipital nerve. In cases where thermal rise needs to be limited to 2-3° C., liFUS may be achieved by reducing the power level to the therapy transducers within 1100.

In various implementations, a numerical model, validated by computer simulations and phantom/ex-vivo tissue studies, may be used to predict ablation pattern in in-vivo cases accurately. Based on analysis, recommendations are defined in terms of control parameters such as power and exposure time, in addition to specific US device insonation patterns.

Methods relating to the herein VF-FUS disclosure include the use of biothermal acoustic models to study interstitial and focused ultrasound applicators. Such methods would enable patient and/or animal anatomy with clinical VF-FUS target volumes to be segmented from images obtained via computed tomography (CT), magnetic resonance imaging (MRI), and/or ultrasonic images. In various implementations, tissue-specific heterogeneous finite-element mesh simulations for computational modeling may be used to predictively assist design optimization and localization of therapy applicators within device 1100. Furthermore, various embodiments of the VF-FUS devices may be configured in different sizes to administer treatment based on the corresponding size of the receiving patient.

In various implementations, a constrained optimization algorithm may automatically maximize the amount of power applied to each transducer, while best heating the target region to therapeutic temperatures, and while avoiding overheating surrounding tissues and minimizing the maximum temperature. A corresponding thermal dose distribution may be calculated for high-temperature therapy, wherein a time of $t_{43}$=240 min and a temperature boundary of 52° C. boundary may be used to define the boundary of thermal necrosis, as first proposed by Damianou et al. (*Transactions on Ultrasonics Ferroelectrics and Frequency Control*, 1995, 42(2): p. 182-187), validated thereafter, and since used in clinical MM-guided thermal therapy. These acoustic and biothermal modeling platforms provide the basis for planning therapy interventions implementing the herein disclosed integrated VF-FUS device.

While the instant disclosure has been described above according to its preferred embodiments, it can be modified within the spirit and scope of this disclosure. This application is therefore intended to cover any variations, uses, or adaptations of the instant disclosure using the general principles disclosed herein. Further, the instant application is intended to cover such departures from the present disclosure as come within the known or customary practice in the art to which this disclosure pertains.

Notwithstanding the embodiments described above in FIGS. 5-30, various modifications and inclusions to those embodiments are contemplated and considered within the scope of the present disclosure. Any of the operations described herein can be implemented as computer-readable instructions stored on a non-transitory computer-readable medium such as a computer memory.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

Herein, references to "volume focused ultrasound" or "VF-FUS" should be considered equivalent to references relating to "low intensity focused ultrasound" or "liFUS" as VF-FUS is herein considered a method involving liFUS.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. An apparatus, comprising:
   a handle coupled to a main body, the main body including a plurality of chambers;
   an imaging transducer array coupled to the main body;
   an imaging probe disposed within the handle and extending through the main body to the imaging transducer array, the imaging probe configured to interface with an opening in the main body; and
   a therapy transducer array comprising a plurality of air backed transducers disposed within the main body, each of the plurality of air backed transducers configured to direct energies from low-intensity focused ultrasound to a treatment region, the imaging transducer array and the therapy transducer array configured to spatially register a location of the treatment region, the treatment region located at a depth below a surface associated with a patient, the therapy transducer array arranged about the opening and the imaging probe such that an imaging plane formed by the imaging probe intersects with the treatment region;
   a control system configured to control power to the plurality of air backed transducers; and
   a water circulation system circulating water through the main body, controlling a temperature associated with the therapy transducer array and configured to cool an interface between the surface and the apparatus.

2. The apparatus of claim 1, wherein the water circulation system comprises a chamber positioned between the therapy transducer array and the treatment region.

3. The apparatus of claim 1, further comprising an air chamber behind the therapy transducer array for maximizing acoustic power delivery to the treatment region.

4. The apparatus of claim 3, wherein the air chamber is positioned between the therapy transducer array and the handle.

5. The apparatus of claim 1, wherein the imaging transducer array has an electronic focal zone between 3 cm and 10 cm, inclusive.

6. The apparatus of claim 5, wherein the imaging transducer array comprises a focal depth corresponding to the depth of the treatment region.

7. The apparatus of claim 1, wherein at least one air backed transducer of the therapy transducer array operates on a different frequency than the rest of the therapy transducer array.

8. The apparatus of claim 1, wherein each air backed transducer of the therapy transducer array operates on a same frequency.

9. An apparatus, comprising:
   a handle coupled with a source of energy;
   a main body coupled to the handle, comprising:
      a bottom portion having a bottom surface configured to interface with a surface associated with a patient; and
      a top portion having a first recess and a second recess, the second recess located substantially central within the main body, the first recess configured to engage with the handle;
   an imaging transducer forming an imaging plane disposed within the main body and interfacing with the second recess;
   a plurality of ultrasound transducers disposed within the main body about the second recess and the imaging transducer, each of the plurality of ultrasound transducers configured to direct energies from low-intensity focused ultrasound to a treatment region, the imaging transducer and the plurality of ultrasound transducers configured to spatially register a location of the treatment region located at a depth below the surface, the plurality of ultrasound transducers configured such that a focus of the imaging plane intersects with the treatment region;
   a first support structure disposed between the top portion and the bottom portion and positioned on a first side of the imaging transducer, the first support structure configured to engage with a first group of the plurality of ultrasound transducers; and
   a chamber formed by the first support structure, the chamber within the main body proximate the bottom surface of the bottom portion, the chamber configured to facilitate water circulation within the main body to cool the plurality of ultrasound transducers and an interface between the bottom surface and the surface.

10. The apparatus of claim 9, wherein the second recess extends entirely through the bottom surface.

11. The apparatus of claim 9, further comprising a second support structure disposed between the top portion and the bottom portion and positioned on a second side of the imaging transducer, the second side opposite the first side, the second support structure configured to engage with a second group of the plurality of ultrasound transducers.

12. The apparatus of claim 11, wherein the first group of the plurality of ultrasound transducers and the second group of the plurality of ultrasound transducers are arranged in a substantially linear configuration about the imaging transducer.

13. The apparatus of claim 11, wherein the first group of the plurality of ultrasound transducers and the second group of the plurality of ultrasound transducers are arranged in a substantially square configuration about the imaging transducer.

14. The apparatus of claim 11, wherein the first group of the plurality of ultrasound transducers comprises a first portion of ultrasound transducers arranged in a substantially square configuration and a second portion of ultrasound transducers arranged at an oblique angle to the imaging transducer, wherein the second group of the plurality of ultrasound transducers comprises a third portion of ultrasound transducers arranged in a substantially square configuration and a fourth portion of ultrasound transducers arranged at an oblique angle to the imaging transducer.

15. The apparatus of claim 11, wherein the imaging transducer comprises a first dimension with a first value and a second dimension with a second value that is smaller than the first value, and wherein an arrangement of the first group of the plurality of ultrasound transducers extends beyond the first dimension.

16. The apparatus of claim 9, wherein the first support structure comprises a curve configured to direct the energies from low-intensity focused ultrasound to the treatment region.

17. An apparatus configured to deliver ultrasound energy to a treatment site of a patient, comprising:
   a main body comprising:
      a bottom portion having a bottom surface configured to interface with a surface associated with the patient; and
      a top portion having a recess located in a central portion of the main body;
   an imaging transducer forming an imaging plane, the imaging transducer engaged with the recess;
   a plurality of ultrasound transducers arranged about the imaging transducer and positioned within the main body, each of the plurality of ultrasound transducers configured to direct energies from low-intensity focused ultrasound to a treatment site, the imaging transducer and the plurality of ultrasound transducers configured to spatially register a location of the treatment region located at a depth below the surface, the plurality of ultrasound transducers configured such that a focus of the imaging plane intersects with the treatment site; and
   a support structure disposed between the top portion and the bottom portion and positioned on a side of the imaging transducer, the support structure configured to engage with the plurality of ultrasound transducers, the support structure configured to form a chamber within the main body, the chamber proximate to the bottom surface of the bottom portion.

18. The apparatus of claim 17, wherein the plurality of ultrasound transducers comprise sectored lead zirconate titanate crystals.

19. The apparatus of claim 18, further comprising air positioned behind the sectored lead zirconate titanate crystals, the air maximizing an acoustic power delivered to the treatment site.

20. The apparatus of claim 18, further comprising water in fluid communication with the bottom surface for maximizing acoustic power transmission into the patient for delivery to the treatment site.

* * * * *